United States Patent
Jo et al.

(10) Patent No.: US 11,296,918 B2
(45) Date of Patent: *Apr. 5, 2022

(54) METHOD FOR TRANSMITTING OR RECEIVING SIGNAL IN WIRELESS COMMUNICATION SYSTEM AND APPARATUS THEREFOR

(71) Applicant: LG Electronics Inc., Seoul (KR)

(72) Inventors: Soonki Jo, Seoul (KR); Yunjung Yi, Seoul (KR); Inkwon Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 51 days.

This patent is subject to a terminal disclaimer.

(21) Appl. No.: 16/729,720

(22) Filed: Dec. 30, 2019

(65) Prior Publication Data

US 2020/0136882 A1 Apr. 30, 2020

Related U.S. Application Data

(63) Continuation of application No. 16/064,723, filed as application No. PCT/KR2018/003465 on Mar. 23, 2018.

(Continued)

(51) Int. Cl.
*H04L 27/26* (2006.01)
*H04L 5/00* (2006.01)
(Continued)

(52) U.S. Cl.
CPC ........ *H04L 27/2666* (2013.01); *H04L 1/0006* (2013.01); *H04L 5/001* (2013.01);
(Continued)

(58) Field of Classification Search
CPC ... H04L 27/2666; H04L 1/0006; H04L 5/001; H04L 5/0048; H04L 5/0053;
(Continued)

(56) References Cited

U.S. PATENT DOCUMENTS

2013/0322397 A1 12/2013 Lee et al.
2014/0161093 A1 6/2014 Hoshino et al.
(Continued)

FOREIGN PATENT DOCUMENTS

KR 2009105789 10/2009
KR 20130039638 4/2013
(Continued)

OTHER PUBLICATIONS

Extended European Search Report in European Application No. 18772013.1, dated Nov. 27, 2020, 11 pages.
(Continued)

*Primary Examiner* — Ronald B Abelson
(74) *Attorney, Agent, or Firm* — Fish & Richardson P.C.

(57) ABSTRACT

A method for receiving, by a terminal, downlink control information in a wireless communication system according to one embodiment of the present invention comprises the steps of: receiving information on a reference subcarrier spacing (SCS) from among a plurality of SCS numerologies; receiving downlink control information through a terminal group common physical downlink control channel (PDCCH); and obtaining information on a slot format from the downlink control information, wherein the downlink control information indicates the slot format on the basis of the reference SCS, and when the SCS of the terminal is different from the reference SCS, the terminal may convert the slot format of the reference SCS according to the SCS of the terminal.

13 Claims, 12 Drawing Sheets

Related U.S. Application Data

(60) Provisional application No. 62/621,495, filed on Jan. 24, 2018, provisional application No. 62/616,450, filed on Jan. 12, 2018, provisional application No. 62/596,785, filed on Dec. 9, 2017, provisional application No. 62/500,557, filed on May 3, 2017, provisional application No. 62/476,682, filed on Mar. 24, 2017.

(51) Int. Cl.
*H04L 1/00* (2006.01)
*H04W 72/04* (2009.01)
*H04W 74/08* (2009.01)

(52) U.S. Cl.
CPC .......... *H04L 5/0048* (2013.01); *H04L 5/0053* (2013.01); *H04L 5/0094* (2013.01); *H04W 72/042* (2013.01); *H04W 72/0446* (2013.01); *H04W 72/0453* (2013.01); *H04W 74/0833* (2013.01)

(58) Field of Classification Search
CPC .............. H04L 5/0094; H04W 72/042; H04W 72/0446; H04W 72/0453
See application file for complete search history.

(56) References Cited

U.S. PATENT DOCUMENTS

| | | |
|---|---|---|
| 2016/0219584 A1 | 7/2016 | Bertrand et al. |
| 2016/0337105 A1 | 11/2016 | Lawton et al. |
| 2018/0083758 A1 | 3/2018 | Islam et al. |
| 2019/0349904 A1 | 11/2019 | Kwak et al. |
| 2019/0380125 A1 | 12/2019 | Yamamoto et al. |
| 2020/0068537 A1 | 2/2020 | Oh et al. |
| 2020/0128578 A1 | 4/2020 | Park et al. |
| 2020/0137737 A1* | 4/2020 | Jo ..................... H04L 27/2666 |
| 2020/0187236 A1 | 6/2020 | Moon et al. |
| 2020/0213068 A1* | 7/2020 | Jo ......................... H04L 5/1469 |
| 2020/0404628 A1* | 12/2020 | Jo ..................... H04W 72/0446 |

FOREIGN PATENT DOCUMENTS

| | | |
|---|---|---|
| KR | WO2016130175 | 8/2016 |
| KR | 20160127727 | 11/2016 |
| KR | 20170007175 | 1/2017 |
| RU | 2452116 | 5/2012 |
| WO | WO2016004900 | 1/2016 |

OTHER PUBLICATIONS

LG Electronics, "Discussion on frame structure for Mini-slot," R1-1700516, 3GPP TSG RAN WG1 NR Ad-Hoc Meeting, Spokane, USA, dated Jan. 16-20, 2017, 5 pages.

MediaTek Inc., "Discussion on slot structure and channel format," R1-1609555, 3GPP TSG RAN WG1 Meeting #86bis, Lisbon, Portugal, dated Oct. 10-14, 2016, 6 pages.

OPPO, "Remaining issues on GC-PDCCH," R1-1802116, 3GPP TSG RAN WG1 Meeting #92, Athens, Greece, Feb. 26-Mar. 2, 2018, 7 pages.

ZTE, Sanechips, "Remaining issues for slot format," R1-1800131, 3GPP TSG RAN WG1 Meeting AH 1801, Vancouver, Canada, Jan. 22-26, 2018, 11 pages.

United States Office Action in U.S. Appl. No. 16/729,976, dated May 21, 2020, 20 pages.

United States Final Office Action in U.S. Appl. No. 16/729,976, dated Sep. 11, 2020, 29 pages.

Intel Corporation, "Group Common PDCCH," R1-1702219, 3GPP TSG RAN WG1 #88, Athens, Greece, dated Feb. 13-17, 2017, 4 pages.

Intel Corporation, "Reference numerology and time alignment," R1-1609503, 3GPP TSG RAN WG1 Meeting #86b, Lisbon, Portugal, dated Oct. 10-14, 2016, 4 pages.

U.S. Notice of Allowance in U.S. Appl. No. 16/729,976, dated Feb. 1, 2021, 18 pages.

3GPP_TSG_RAN_WG1_NR Archives, "[NR-DL] draft WF regarding slot type indication," dated Feb. 17, 2017, 2 pages.

CATT, "NR frame structure for multiplexing of URLLC and eMBB traffic," R1-1700204, 3GPP TSG RAN WG1 NR Ad hoc Meeting, Spokane, WA, USA, Jan. 16-20, 2017, 4 pages.

Huawei, HiSilicon, "Remaining issues on group-common PDCCH," R1-1801336, 3GPP TSG RAN WG1 Meeting #92, Athens, Greece, dated Feb. 26-Mar. 2, 2018, 4 pages.

Huawei, HiSilicon, "Remaining issues on SFI with TP," R1-1800838, 3GPP TSG RAN WG1 Ad Hoc Meeting, Vancouver, Canada, dated Jan. 22-26, 2018, 7 pages.

Huawei, HiSilicon, "TP on UE behavior for determining slot format," R1-1801779, 3GPP TSG RAN WG1 Meeting #92, Athens, Greece, dated Feb. 26-Mar. 2, 2018, 4 pages.

Intel Corporation, "Reference numerology and lime alignment," R1-1609503, 3GPP TSG RAN WG1 Meeting #86b, Lisbon, Portugal, Oct. 10-14, 2016, 5 pages.

JP Japanese Office Action in Japanese Application No. 2018-567942, dated Sep. 17, 2019, 7 pages (with English translation).

KR Office Action issued in Korean Application No. 10-2018-7015863, dated Apr. 19, 2019, 4 pages (with English translation).

LG Electronics, "Further discussion on common signaling," R1-1702474, 3GPP TSG RAN WG1 Meeting #88, Athens, 3reece Feb. 13-17, 2017, 7 pages.

LG Electronics, "Remaining issues on group common PDCCH," R1-1802208, 3GPP TSG RAN WG1 Meeting #92, Athens, Greece, dated Feb. 26-Mar. 2, 2018, 12 pages.

Panasonic, "Control signalling design on downlink resource allocation," R1-1703279, 3GPP TSG-RAN WG1 Meeting #88, Feb. 13-27, 2017, Athens, Greece, 5 pages.

Qualcomm Incorporated, "Summary of [86-19] Discussion on Slot Structure Use Cases," R1-1610128, 3GPP TSG-RAN WG1 #86bis, Oct. 10-14, 2016, Lisbon, Portugal, 21 pages.

RU Russian Notice of Allowance in Russian Application No. 2019101638, dated Jun. 28, 2019, 21 pages (with English translation).

Samsung, "On UE-Common NR-PDCCH," R1-1702970, 3GPP TSG RAN WG1 #88, Athens, Greece, Feb. 13-17, 2017, 5 pages.

U.S. Notice of Allowance in U.S. Appl. No. 16/729,996, dated Jun. 3, 2021, 27 pages.

LG Electronics, "Discussion on group common PDCCH," R1-1800373, Presented at 3GPP TSG RAN WG1 NR AH1801, Vancouver, Canada Jan. 22-26, 2018, 15 pages.

LG Electronics, "Discussion on slot structure indication," R1-1704902, Presented at 3GPP TSG RAN WG1 Meeting #88bis, Spokane, US Apr. 3-7, 2017, 5 pages.

Office Action in European Appln. No. 18772013.1, dated Jan. 31, 2022, 8 pages.

\* cited by examiner

FIG. 4

| Entry index | Slot format |
|---|---|
| 1 | SF1-slot1 \| SF1-slot2 \| SF2-slot1 |
| 2 | SF1-slot1 \| SF2-slot1 \| SF3-slot1 \| SF1-slot2 \| SF2-slot2 \| SF3-slot2 |
| 3 | SF1-slot1 \| SF1-slot2 \| SF2-slot1 \| SF1-slot3 \| SF1-slot4 \| SF2-slot2 |
| 4 | SF1-slot1 \| SF1-slot2 \| SF2-slot1 SF2-slot2 SF2-slot3 SF2-slot4 \| SF3-slot1 |
| ... | ... |

FIG. 5

| Entry index | Slot format for band1 | Slot format for band2 |
|---|---|---|
| 1 | SF1-slot1 \| SF1-slot2 | SF2-slot1 \| SF2-slot2 |
| 2 | SF1-slot1 \| SF1-slot2 \| SF1-slot3 \| SF1-slot4 | SF2-slot1 \| SF2-slot2 |
| ... | ... | ... |

FIG. 6

| Entry index | Slot format for band1 | Slot format for band2 | Slot format for band3 |
|---|---|---|---|
| 1 | SF1-slot1 / SF1-slot2 | SF2-slot1 / SF2-slot2 | SF3-slot1 / SF3-slot2 |
| 2 | SF1-slot1 / SF1-slot2 | SF2-slot1 SF2-slot2 SF2-slot3 SF2-slot4 | SF3-slot1 |
| ... | ... | ... | ... |

FIG. 7

| Entry index | Band 1 | | | Band 2 | |
|---|---|---|---|---|---|
| | 15kHz | 30kHz | 60kHz | 15kHz | 30kHz |
| 1 | SF1-slot1 | SF1-slot1 SF1-slot2 | SF1-slot1 SF1-slot2 SF1-slot3 SF1-slot4 | SF2-slot1 | SF2-slot1 SF2-slot2 |
| 2 | SF1-slot1 SF1-slot1 | SF1-slot1 SF1-slot2 SF1-slot3 SF1-slot4 | SF1-slot1 SF1-slot2 SF1-slot3 SF1-slot4 SF1-slot5 SF1-slot6 SF1-slot7 SF1-slot8 | SF2-slot1 SF2-slot1 | SF2-slot1 SF2-slot2 SF2-slot3 SF2-slot4 |
| 3 | | | | | |
| ... | | | | | |

FIG. 9
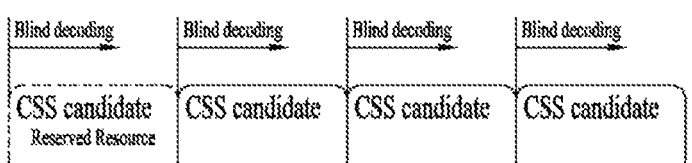
(a)
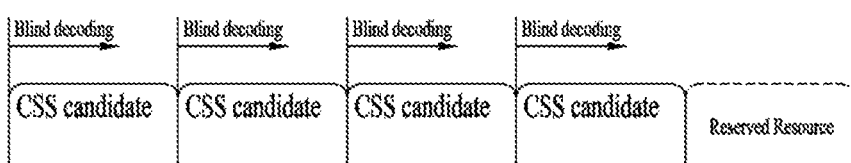
(b)
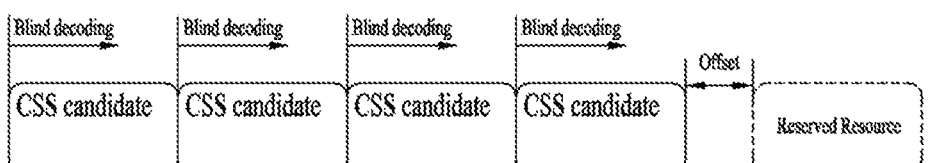
(c)

FIG. 10
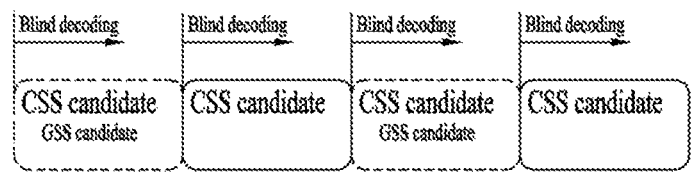
(a)
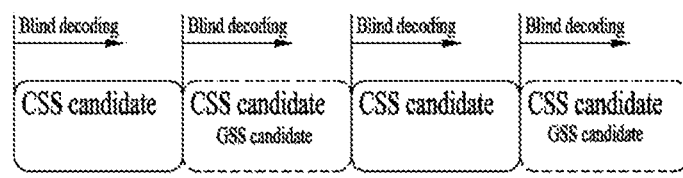
(b)
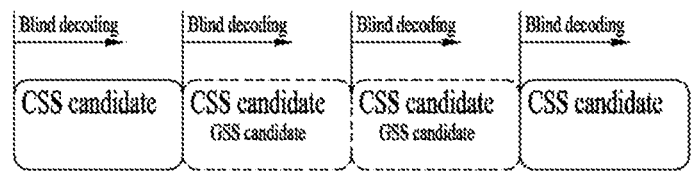
(c)
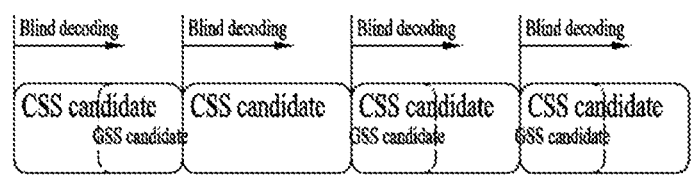
(d)

FIG. 11
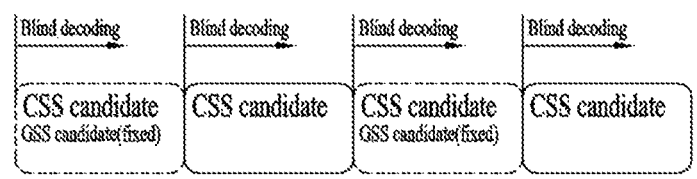
(a)
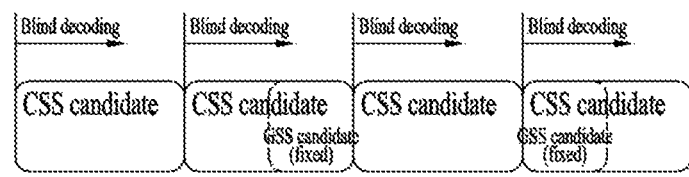
(b)
FIG. 12
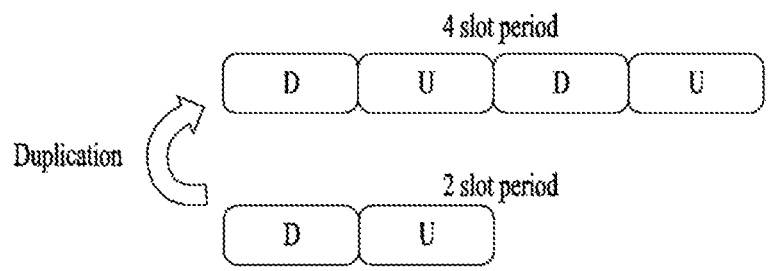

FIG. 13
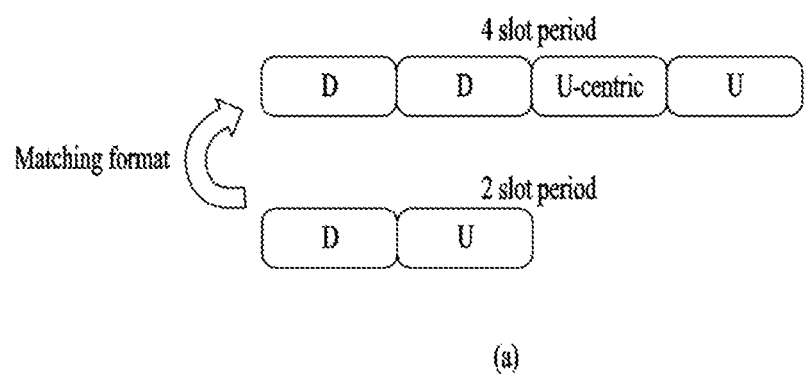
(a)
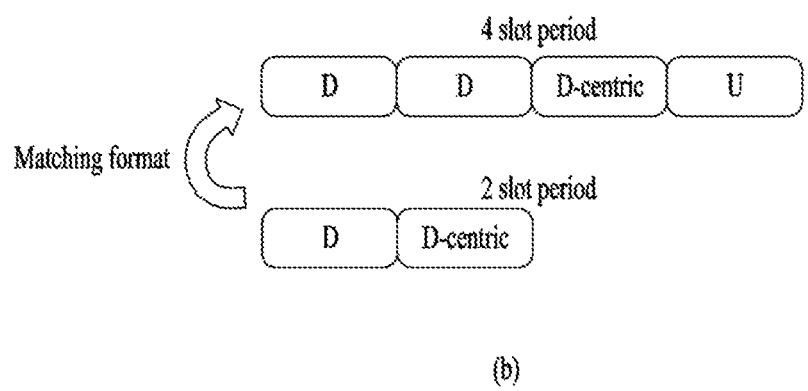
(b)

FIG. 14
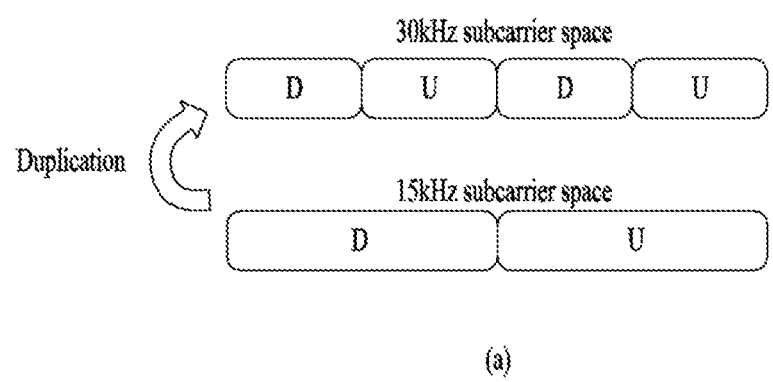
(a)
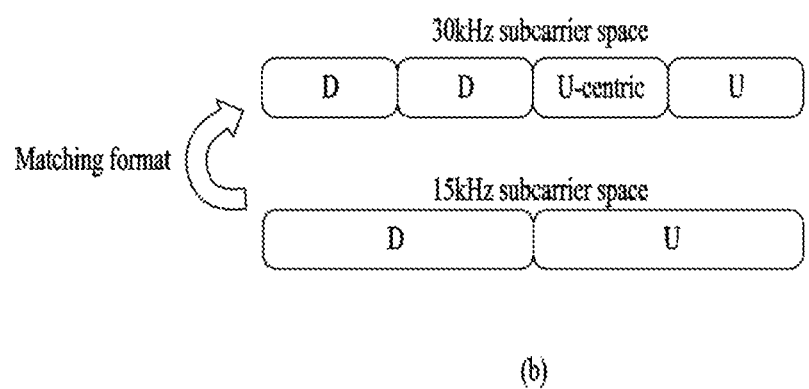
(b)

METHOD FOR TRANSMITTING OR RECEIVING SIGNAL IN WIRELESS COMMUNICATION SYSTEM AND APPARATUS THEREFOR

CROSS-REFERENCE TO RELATED APPLICATIONS

This application is a continuation of U.S. application Ser. No. 16/064,723, filed on Jun. 21, 2018, which claims the benefit of International Application No. PCT/KR2018/003465, filed on Mar. 23, 2018, which claims the benefit of U.S. Provisional Application No. 62/621,495, filed on Jan. 24, 2018, U.S. Provisional Application No. 62/616,450, filed on Jan. 12, 2018, U.S. Provisional Application No. 62/596,785, filed on Dec. 9, 2017, U.S. Provisional Application No. 62/500,557, filed on May 3, 2017, and U.S. Provisional Application No. 62/476,682, filed on Mar. 24, 2017. The disclosures of the prior applications are incorporated by reference in their entirety.

TECHNICAL FIELD

The present invention relates to a wireless communication system and, more particularly, to a method and apparatus for transmitting or receiving downlink (DL) control information in a wireless communication system.

BACKGROUND ART

First, the existing 3GPP LTE/LTE-A system will be briefly described. Referring to FIG. 1, the UE performs an initial cell search (S101). In the initial cell search process, the UE receives a Primary Synchronization Channel (P-SCH) and a Secondary Synchronization Channel (S-SCH) from a base station, performs downlink synchronization with the BS, and acquires information such as a cell ID. Thereafter, the UE acquires system information (e.g., MIB) through a PBCH (Physical Broadcast Channel). The UE can receive the DL RS (Downlink Reference Signal) and check the downlink channel status.

After the initial cell search, the UE can acquire more detailed system information (e.g., SIBs) by receiving a Physical Downlink Control Channel (PDCCH) and a Physical Downlink Control Channel (PDSCH) scheduled by the PDCCH (S102).

The UE may perform a random access procedure for uplink synchronization. The UE transmits a preamble (e.g., Msg1) through a physical random access channel (PRACH) (S103), and receives a response message (e.g., Msg2) for the preamble through PDCCH and PDSCH corresponding to the PDCCH. In the case of a contention-based random access, a contention resolution procedure such as additional PRACH transmission (S105) and PDCCH/PDSCH reception (S106) may be performed.

Then, the UE can perform PDCCH/PDSCH reception (S107) and Physical Uplink Shared Channel (PUSCH)/Physical Uplink Control Channel (PUCCH) transmission (S108) as a general uplink/downlink signal transmission procedure. The UE can transmit UCI (Uplink Control Information) to the BS. The UCI may include HARQ ACK/NACK (Hybrid Automatic Repeat reQuest Acknowledgment/Negative ACK), SR (Scheduling Request), CQI (Channel Quality Indicator), PMI (Precoding Matrix Indicator) and/or RI etc.

DISCLOSURE

Technical Problem

An object of the present invention devised to solve the problem lies in a method and apparatus for more effectively and accurately indicating a slot format through downlink (DL) control information in a wireless communication system for supporting multiple subcarrier spacing (SCS).

It is to be understood that both the foregoing general description and the following detailed description of the present invention are exemplary and explanatory and are intended to provide further explanation of the invention as claimed.

Technical Solution

The object of the present invention can be achieved by providing a method of receiving downlink (DL) control information by a user equipment (UE) in a wireless communication system, the method including receiving information on reference subcarrier spacing (SCS) among a plurality of SCS numerologies, receiving DL control information through a UE group common physical downlink control channel (PDCCH), and acquiring information on a slot format from the DL control information, wherein the DL control information indicates the slot format based on the reference SCS, and wherein, when SCS of the UE is different from the reference SCS, the UE converts a slot format of the reference SCS according to the SCS of the UE.

In another aspect of the present invention, provided herein is a user equipment (UE) for receiving downlink (DL) control information, including a receiver, and a processor configured to control the receiver to receive information on reference subcarrier spacing (SCS) among a plurality of SCS numerologies, to receive DL control information through a UE group common physical downlink control channel (PDCCH), and to acquire information on a slot format from the DL control information, wherein the DL control information indicates the slot format based on the reference SCS, and wherein, when SCS of the UE is different from the reference SCS, the processor converts a slot format of the reference SCS according to the SCS of the UE.

In another aspect of the present invention, provided herein is a method of transmitting downlink (DL) control information by a base station (BS) in a wireless communication system, the method including transmitting information on reference subcarrier spacing (SCS) among a plurality of SCS numerologies, generating DL control information including information on a slot format, and transmitting the DL control information to a UE group including the UE through a UE group common physical downlink control channel (PDCCH), wherein, even if the SCS of the UE is different from the reference SCS, the BS notifies the UE about the slot format based on the reference SCS.

In another aspect of the present invention, provided herein is a base station (BS) for performing the aforementioned DL control information transmitting method.

The information on the reference SCS may be received via higher layer signaling.

Time duration of 1 slot may be variable depending on SCS, and the reference SCS may be configured to be equal to or less than the SCS of the UE such that time duration of 1 slot based on the reference SCS is equal to or greater than time duration of 1 slot based on the SCS of the UE.

When the SCS of the UE is M times the reference SCS, the UE may interpret 1 slot based on the reference SCS as M contiguous slots based on the SCS of the UE.

The UE may determine, based on the information on the slot format, whether each of a plurality of symbols included in a corresponding slot corresponds to downlink (D), uplink (U), or flexible (X); and, wherein, when the SCS of the UE is M times the reference SCS, the UE may interpret one D, U, or X symbol based on the reference SCS as M number of D, U, or X symbols based on the SCS of the UE.

The information on the slot format may indicate at least one of slot formation combinations configured in the UE.

The UE may be configured with a plurality of frequency bands and each slot format combination may be a combination of a plurality of slot formats of the plurality of frequency bands.

The each slot format combination is a combination of a slot format for a DL frequency band and a slot format for a UL frequency band. Alternatively, wherein the each slot format combination may be a combination of a slot format for a new radio access technology (NR) frequency band and a slot format for a long-term evolution (LTE) frequency band.

The slot formation combinations configured in the UE may be received via higher layer signaling and may be a subset of a plurality of slot format combinations supported in the wireless communication system.

Advantageous Effects

According to an embodiment of the present invention, reference subcarrier spacing (SCS) is configured in a wireless communication system in which multiple SCS is supportable to accurately interpret a slot format and a slot format may be signaled UE-group commonly based on the reference SCS and, thus, a payload size of a physical downlink control channel (PDCCH) may be reduced and overhead of the PDCCH may be reduced compared with the case in which a slot format is indicated for each separate SCS.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

DESCRIPTION OF DRAWINGS

FIG. 4 illustrates combinations of slot formats according to another embodiment of the present invention.

FIGS. 5 and 6 illustrate combinations of slot formats according to another embodiment of the present invent.

FIG. 7 illustrates a combination of slot formats according to an embodiment of the present invention.

FIG. 9 illustrates reserved resource allocation for a group common physical downlink control channel (PDCCH) according to an embodiment of the present invention.

FIG. 10 illustrates a GSS deployed in a CSS according to an embodiment of the present invention.

FIG. 11 illustrates GSS candidates having a fixed position in a CSS according to an embodiment of the present invention.

FIGS. 12 and 13 illustrate slot patterns of multiple CCs according to an embodiment of the present invention.

FIG. 14 illustrates slot patterns of multiple CC according to another embodiment of the present invention.

MODE FOR INVENTION

Figure 1:
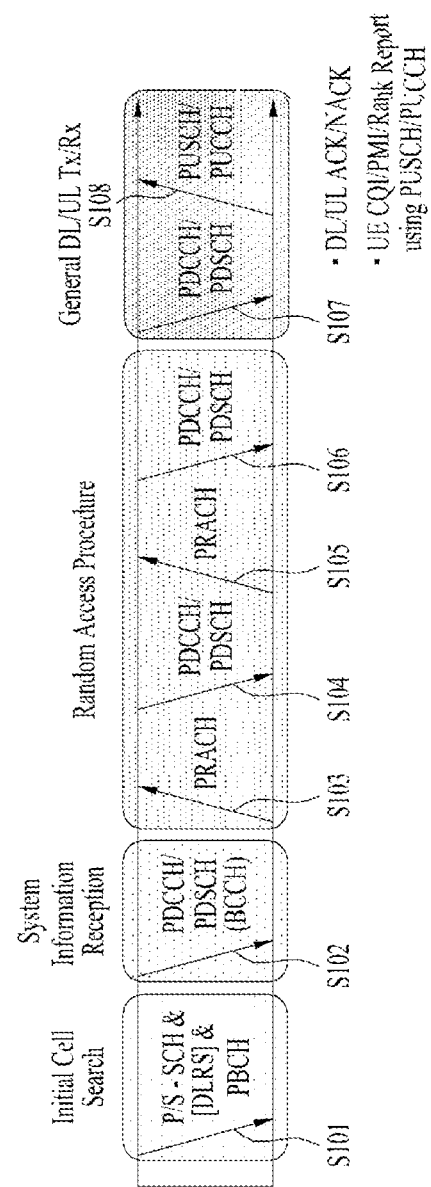
FIG. 1 illustrates physical channels used in a 3GPP LTE/LTE-A system and a general signal transmission method using the physical channels.

The following description of embodiments of the present invention may apply to various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. 3GPP LTE adopts OFDMA in downlink and adopts SC-FDMA in uplink. LTE-A (LTE-Advanced) is an evolved version of 3GPP LTE.

For clarity, the following description mainly concerns 3GPP LTE system or 3GPP LTE-A system, by which the technical idea of the present invention may be non-limited. Specific terminologies used in the following description are provided to help understand the present invention and the use of the terminologies can be modified to a different form within a scope of the technical idea of the present invention.

As many as possible communication devices have demanded as high as communication capacity and, thus, there has been a need for enhanced mobile broadband (eMBB) communication compared with legacy radio access technology (RAT) in a recently discussed next-generation communication system. In addition, massive machine type communications (mMTC) for connecting a plurality of devices and objects to provide various services anytime and anywhere is also one of factors to be considered in next-generation communication. In addition, in consideration of a service/user equipment (UE) that is sensitive to reliability and latency, ultra-reliable and low latency communication (URLLC) has been discussed for a next-generation communication system.

As such, new RAT that considers eMBB, mMTC, URLCC, and so on has been discussed for next-generation wireless communication.

Some LTE/LTE-A operations and configuration that are not at variance to a design of New RAT may also be applied to new RAT. For convenience, new RAT may be referred to as 5G mobile communication.

<NR Frame Structure and Physical Resource>

In an NR system, downlink (DL) and downlink (UL) transmission may be performed through frames having duration of 10 ms and each frame may include 10 subframes. Accordingly, 1 subframe may correspond to 1 ms. Each frame may be divided into two half-frames.

1 subframe may include $N_{symb}^{subframe,\mu}=N_{symb}^{slot} \times N_{slot}^{subframe,\mu}$ contiguous OFDM symbols. $N_{symb}^{slot}$ represents the number of symbols per slot, μ represents OFDM numerology, and $N_{slot}^{subframe,\mu}$ represents the number of slots per subframe with respect to corresponding μ. In NR, multiple OFDM numerologies shown in Table 1 below may be supported.

TABLE 1

| μ | $\Delta f = 2^\mu \cdot 15[kHz]$ | Cyclic prefix |
| --- | --- | --- |
| 0 | 15 | Normal |
| 1 | 30 | Normal |
| 2 | 60 | Normal, Extended |
| 3 | 120 | Normal |
| 4 | 240 | Normal |

In Table 1 above, Δf refers to subcarrier spacing (SCS). μ and cyclic prefix with respect to a DL carrier bandwidth part (BWP) and μ and cyclic prefix with respect to a UL carrier BWP may be configured for a UE via UL signaling.

Table 2 below shows the number of $N_{symb}^{slot}$ of symbols per slot, the number $N_{slot}^{frame,\mu}$ of symbols per frame, and the number $N_{slot}^{subframe,\mu}$ of slots per subframe with respect to each SCS in the case of normal CP.

TABLE 2

| μ | $N_{symb}^{slot}$ | $N_{slot}^{frame, \mu}$ | $N_{slot}^{subframe, \mu}$ |
| --- | --- | --- | --- |
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 32 | 32 |

Table 3 below shows the number $N_{symb}^{slot}$ of symbols per slot, the number $N_{slot}^{frame,\mu}$ of slots per frame, and the number $N_{slot}^{subframe,\mu}$ of slots per subframe with respect to each SCS in the case of extended CP.

TABLE 3

| μ | $N_{symb}^{slot}$ | $N_{slot}^{frame, \mu}$ | $N_{slot}^{subframe, \mu}$ |
| --- | --- | --- | --- |
| 2 | 12 | 40 | 4 |

As such, in an NR system, the number of slots included in 1 subframe may be variable depending on subcarrier spacing (SCS). OFDM symbols included in each slot may correspond to any one of D (DL), U (UL), and X (flexible). DL transmission may be performed in a D or X symbol and UL transmission may be performed in a U or X symbol. A Flexible resource (e.g., X symbol) may also be referred to as a Reserved resource, an Other resource, or a Unknown resource.

In NR, one resource block (RB) may correspond to 12 subcarriers in the frequency domain. A RB may include a plurality of OFDM symbols. A resource element (RE) may correspond to 1 subcarrier and 1 OFDM symbol. Accordingly, 12 REs may be present on 1 OFDM symbol in 1 RB.

A carrier BWP may be defined as a set of contiguous physical resource blocks (PRBs). The carrier BWP may also be simply referred to a BWP. A maximum of 4 BWPs may be configured for each of UL/DL link in 1 UE. Even if multiple BWPs are configured, 1 BWP may be activated for a given time period. However, when a supplementary uplink (SUL) is configured in a UE, 4 BWPs may be additionally configured for the SUL and 1 BWP may be activated for a given time period. A UE may not be expected to receive a PDSCH, a PDCCH, a channel state information-reference signal (CSI-RS), or a tracking reference signal (TRS) out of the activated DL BWP. In addition, the UE may not be expected to receive a PUSCH or a PUCCH out of the activated UL BWP.

<NR DL Control Channel>

In an NR system, a transmissions NR system, a transmission unit of a control channel may be defined as a resource element group (REG) and/or a control channel element (CCE), etc.

An REG may correspond to 1 OFDM symbol in the time domain and may correspond to 1 PRB in the frequency domain. In addition, 1 CCE may correspond to 6 REGs.

A control resource set (CORESET) and a search space (SS) are briefly described now. The CORESET may be a set of resources for control signal transmission and the search space may be aggregation of control channel candidates for perform blind detection. The search space may be configured for the CORESET. For example, when one search space is defined on one CORESET, a CORESET for a common search space (CSS) and a CORESET for a UE-specific search space (USS) may each be configured. As another example, a plurality of search spaces may be defined in one CORESET. For example, the CSS and the USS may be configured for the same CORESET. In the following example, the CSS may refer to a CORESET with a CSS configured therefor and the USS may refer to a CORESET with a USS configured therefor, or the like.

A base station may signal information on a CORESET to a UE. For example, a CORESET configuration for each CORESET and time duration (e.g., 1/2/3 symbol) of the corresponding CORESET may be signaled. When interleaving for distributing a CCE to 1 symbol-CORESET is applied, 2 or 6 REGs may be bundled. Bundling of 2 or 6 REGs may be performed on 2 symbol-CORESET and time-first mapping may be applied. Bundling of 3 or 6 REGs may be performed on 3 symbol-CORESET and time-first mapping may be applied. When REG bundling is performed, the UE may assume the same precoding with respect to a corresponding bundling unit.

<Slot Format Indication>

A slot type and an operating method of a UE when a guard period (GP) is maintained or changed are described now. In addition, a method of handling slot type indication when numerology of a slot type is changed and methods of indicating reserved resources are described below. A slot type may be referred to as a slot format.

1. Slot Type Indication

A UE may receive information on a slot type. The information on the slot type may indicate a slot type and may include information on, for example, a downlink pilot time slot (DwPTS), a uplink pilot time slot (UpPTS), a guard period (GP), and a reserved resource.

The information on the slot type may be periodically or aperiodically transmitted. Whether the received slot type indication information is applied may be determined by the UE or may be forcibly applied.

For example, the information on the slot type may be received through a PDCCH. For example, the information on the slot type may be received through a common PDCCH or may also be received through UE-specific control information (e.g., DCI).

The information on the slot type received through the common PDCCH may be control information for collectively indicating a slot type to a specific UE group or all UEs in a cell. The information on the slot type received through the UE-specific PDCCH may be control information indicating a slot type of each UE.

2. Guard Period (GP)

(1) GP Based on Slots, all of which are Configured in DL or UL

A GP may be defined according to an end position of a DwPTS and a start position of an UpPTS.

The GP may be positioned subsequent to the DwPTS. The end position of the DwPTS may be transmitted to a UE through a common PDCCH. For example, the UE may calculate the GP based on the transmitted end position of the DwPTS, and the UpPTS and the UL slot in which transmission is to be performed. Separately, indication of the GP may be signaled to the UE.

The GP may be positioned before the UpPTS. The UE may receive information on a start position of the UpPTS through the common PDCCH. The UE may use the start position of the UpPTS as an end position of the GP without change or the UE may determine the end position of the GP based on the start position of the UpPTS.

The GP may be present only in a slot or may be present between slots. The position and length of the GP may not be limited. It may be possible that the GP is present over between slots when a DL slot and a UL slot are contiguously present. For example, the GP may be present between a DL slot and a UL slot.

A method of forming a GP for each UE or for each UE group may be configured. Configuration of the GP may be cell-common or may be predefined.

Each UE or UE group may be configured with a GP and, in this case, greater or fewer cell-specific GPs may be configured than GPs signaled to each UE or UE group. For example, when the number of GPs of the UE is less than cell-specific or group common GPs, an additional resource may be used as a GP according to dynamic indication and, when the number of GPs of the UE is greater than the cell-specific or group common GPs, an additional GP may be formed according to a predetermined rule.

(i) When GP is Maintained Constant

A GP of a UE may be maintained constant and may not be affected by a common PDCCH after the GP is configured once. For example, a cell-common or group common GP transmitted in a system information block (SIB) or the like may not be changed by a common PDCCH. In addition, indication of a GP in the common PDCCH may be omitted.

For example, when a GP is 5-symbol and one slot is 14-symbol, D, U, or reserved with respect to 9 symbols may be indicated. In addition, the GP may be configured for each subframe or for each slot set. The GP configuration may be given as fallback configuration. For example, the GP configured in fallback may always be assumed with respect to a common PDCCH. Fixed DL, UL, GP, or reserved, configured in fallback, may be assumed and, thus, corresponding indication may be omitted from the common PDCCH.

(ii) When GP is Changeable by Common PDCCH

A GP of a UE may be changeable by a common PDCCH. There may be no problem when the UE normally receives the common PDCCH but there may be a problem in terms of GP configuration when the common PDCCH is not capable of being received.

Accordingly, a network needs to notify the UE about a minimum GP and a maximum GP which are supported by a cell. The minimum GP may be defined not to be changed by the common PDCCH. For example, the minimum GP may be 0.

a. Fallback Operation when Common PDCCH is Missed

Upon determining that slot type indication is not received by the UE or is not transmitted, the UE may maintain a most recently indicated slot type.

In addition, when a specific slot type is preconfigured to the UE via semi-static signaling and the UE misses slot type indication or is not capable of receiving the slot type indication, a slot type pre-configured via semi-static signaling may be used.

GPs of best/worst cases, used for fallback, may be defined. When a common PDCCH is defined to indicate the best GP, a GP signaled for fallback may also be configured as the best GP. When the common PDCCH is defined to indicate the worst GP, a GP signaled for fallback may also be configured as the worst GP.

A GP of the best/worst case GP, which is applied for fallback, may be predefined or may be configured by a network. This may be required to define an operation of the UE when fallback configuration is applied.

(2) when all UEs in Cell Use the Same GP

An environment in which all UEs in a cell use the same GP may be considered. A size of a DwPTS in which a UE receives a signal and a size of an UpPTS in which the UE transmits a signal may be the same with respect to all UEs or may be different for the UEs.

When a size of DwPTS/UpPTS is different for each UE, a PTS of each UE may be configured to be sufficiently put in a slot type indicated by the PTS. For example, even if a size of DwPTS/UpPTS is different for each UE, the size of DwPTS/UpPTS of all UEs may be a size of a PTS in which UL/DL transmission and reception are enabled without change in a slot type indicated UE-group commonly. Alternatively, in reality, the size of the DwPTS/UpPTS of the all UEs may be the same.

(3) When GP is Different for Each UE

An environment in which all UEs in a cell are capable of using different GPs may be considered. A size of a DwPTS in which a UE receives a signal and a size of a UpPTS in which the UE transmits a signal may be the same for the all UEs or may be different for each UE.

Upon notifying UEs about GP information through a common PDCCH, a network may configure end positions of DwPTSs of all UEs to be the same. For example, an end position of the DwPTS may be the latest point, the earliest point, or the intermediate point among the end points of the DwPTS of UEs in a cell.

(i) When Latest End Point of DwPTS is Indicated

The end position of the DwPTS indicated by the network may be the latest point among end points of the DwPTSs of UEs in a cell. Accordingly, an end position of a DwPTS of a specific UE may be earlier than the end position of the DwPTS indicated through the common PDCCH. In this case, the UE may first terminate DL reception and, thus, may further transmit UL data by an ensured time period or may transmit UL data only in an UpPTS.

(ii) When Earliest End Point of DwPTS is Indicated

The end position of the DwPTS indicated by the network may be the earliest point among end points of the DwPTSs of UEs in a cell. Accordingly, an end position of a DwPTS of a specific UE may be later than the end position of the DwPTS indicated through the common PDCCH. In this case, when a start position of a UpPTS of a UE is within a GP, the corresponding UE may transmit an UpPTS in UL without change and, when the start position of the UpPTS is not within the GP, the UE may shorten the UpPTS and transmit the UpPTS in UL or may skip UL transmission on the corresponding UpPTS.

(iii) When End Position of Average DwPTS is Indicated

The end position of the DwPTS indicated by the network may be an average point among end points of the DwPTSs of UEs in a cell. Accordingly, an end position of a DwPTS of a specific UE may be later or earlier than the end position of the DwPTS indicated through the common PDCCH. In consideration of this situation, two UpPTS types may be defined to a short UpPTS and a long UpPTS and the UE may prepare transmission with respect to two UpPTS types.

3. Handling of Different Numerologies and Slot Sizes

When numerology of a DwPTS, an UpPTS, or the like, which is transmitted and received by a UE, is changed, a slot size may also be changed. According to whether a slot type indicated through a common PDCCH is indicated based on numerology that is currently used by the UE or is indicated based on reference numerology, an operation of the UE and a used slot may be changed.

For example, the reference numerology as a reference for indication of a slot type may be defined/configured. When the slot type is indicated based on the reference numerology, the UE may change and interpret the indicated slot type according to numerology used by the UE. The UE may change a slot size indicated based on the reference numerology by the common PDCCH to a slot size corresponding to numerology used by the UE and may apply the changed slot size.

As another example, when a network indicates a slot type, the network may indicate a slot type according to numerology used by the UE. In this case, the UE may apply the slot type indicated by the network without change rather than separately calculating a slot size.

4. Periodic Resource Configuration

Among resources required to maintain connection of a UE with a network, there may be resources that are not clearly defined or a slot type of which is not defined. To use such resources, the network may signal a configuration of corresponding resources using a common PDCCH or may basically define a static configuration with respect to use of the corresponding resources.

(1) CSI-RS

To receive a CSI-RS by the UE, the following methods may be considered.

(i) For example, the UE may be defined to always receive a periodic CSI-RS. Without separate indication for CSI-RS reception, the UE may assume that the periodic CSI-RS is always transmitted by a network and may operate.

(ii) As another example, the UE may pre-knows candidate resources in which a periodic CSI-RS is to be transmitted and the network may notify the UE about whether a CSI-RS is actually transmitted to a corresponding resource through the common PDCCH. In this case, load may be reduced compared with the case in which the UE always receives the CSI-RS but the UE needs to appropriately receive the common PDCCH to receive the CSI-RS.

The network may also configure the methods (i) and (ii) according to a channel situation.

For example, the CSI-RS may be classified into two types. The network may distinguish between a guaranteed CSI-RS in which transmission is ensured and a potential CSI-RS in which transmission is to be enabled and may transmit a CSI-RS configuration. The guaranteed CSI-RS may be always transmit without indication through a common PDCCH and transmission of the potential CSI-RS may be activated through a common PDCCH or other control signals.

The guaranteed CSI-RS may be used for periodic CSI report and the potential CSI-RS may also be used for aperiodic CSI report that is triggered as necessary.

Both the guaranteed CSI-RS and the potential CSI-RS may be used for periodic/aperiodic CSI measurement.

Alternatively, the UE may selectively use the two types of CSI-RSs according to the cases.

(2) Grand-Free Resource

In NR, a grant-free resource in which a UE performs UL transmission without reception of DCI corresponding to UL grant may be configured.

For example, there may be an always grant-free resource that is always used as a grant-free resource and a flexible grant-free resource that is configured as a grant-free resource according to dynamic indication through a common PDCCH.

Even if the UE does not receive indication of a flexible resource, the UE may use the always grant-free resource.

For example, the always grant-free resource may assist the flexible grant-free resource.

In a state in which the UE pre-knows candidates of all grant-free resources, the network may indicate the grant-free resource that is to be used by the corresponding UE through a common PDCCH. In this case, upon appropriately receiving the common PDCCH, there may be a limit in that the UE is capable of using the grant-free resource but the grant-free resource in a system may be minimized.

The network may determine a UE group that is capable of attempting to access every grant-free resource and may also notify only the corresponding group about the grant-free resource through the common PDCCH. In this case, the common PDCCH may include identification information on UE(s) that is capable of accessing the corresponding grant-free resource.

The UE that is capable of accessing the corresponding grant-free resource may be determined according to priority. For example, the priority may be determined based on a rate of failure to the number of times of access attempts or may be determined based on the size/urgent degree of UL data to be transmitted.

Such a method of configuring always (or fixed)/flexible resources may also be applied to a semi-static resource such as a radio resource management-reference signal (RRM-RS) resource, a random access channel (RACH) resource, and a synchronization signal (SS) block resource.

More characteristically, in the case of the RRM-RS, a fixed resource may be used for neighboring cell measurement and a flexible resource may be used for serving cell measurement. Transmission/reception points (TRPs) may exchange configurations of fixed resources with each other and may configure the exchanged configurations for a UE.

The fixed resource may be configured with a longer period than the flexible resource and the period of the fixed resource may influence on delay/accuracy of neighboring cell measurement. With respect to a neighboring cell with an excellent measurement result equal to or greater than a threshold value, the UE may be configured to perform measurement on the flexible resource of the neighboring cell. To perform measurement in the flexible resource of the neighboring cell, the UE may read a common PDCCH of the neighboring cell. For example, a serving cell may signal information on a configuration of the common PDCCH of the neighboring cell and information on a transmission method such as a period to the UE or the neighboring cell may broadcast the corresponding information through an SIB or the like.

In addition, neighboring cell measuring report using the UE using the flexible resource may be triggered by a network. For example, flexible resources may be additionally used only in aperiodic RRM report triggered by the network.

<Summary of Slot Type Indication and Additional Proposals>

Additional proposals in addition to the above descriptions are described below.

To design a group common PDCCH for slot type indication, potential differences in NR compared to enhancements to LTE TDD for DL-UL interference management and traffic adaptation (LTE eIMTA) need to be considered. For example, it may be required to consider that different GP lengths are configured for respective UEs in NR. Such consideration may be more important when different UEs use different numerologies or are related to different usage scenarios. In addition, it may be required to consider indication of a slot structure in an NR network that provides multiple numerologies.

It may also be required to consider a relationship between a semi-static configuration and dynamic slot type indication and, for example, the dynamic indication may override the semi-static configuration for measurement for more flexible design of an NR system than LTE.

1. UE-Specific GP Configuration

In an unpaired spectrum in which UL and DL are used in a TDM manner, it may be general to assume that a network operates in any one of UL and DL at one time irrespective of a used numerology.

In an LTE system, a cell-specific GP length may be configured for all UEs. However, it may be inefficient to configure the same GP length for all UEs in a cell in the NR system. For example, when a GP length is configured as 2 symbols based on numerology corresponding to SCS of 15 kHz, the corresponding GP length may correspond to 8 symbols in numerology corresponding to SCS of 60 kHz. As such, the GP length corresponding to 8 symbols may be a longer time period than a GP length that is actually required for a UE that operates based on SCS of 60 kHz and a radio resource may be wasted.

In consideration different propagation delays, different numerologies, and/or different QoS requirements, a UE-specific GP configuration may be more appropriate than a cell-specific/UE-common GP configuration in NR. To use a UE-specific GP, a maximum GP supported by a network may be signaled to a UE. In addition, the UE-specific GP may be determined and signaled.

As such, NR may support a UE-specific GP configuration.

2. UE Operation According to Slot Type

When slot type indication is given, a UE may determine a DL symbol, a UL symbol, and/or other symbols (e.g., flexible symbols) from the slot type indication. Detailed contents on the slot type indication may indicate, for example, one of predefined slot patterns, bitmap of DL/UL, and/or lengths of DwPTS and UpPTS but are not limited thereto. To indicate a proper slot type, it may be required to define handling of different GP lengths.

In signaling of a DL portion (resource) and a UL portion (resource) for a group common PDCCH, two approaches may be broadly considered.

(i) A first method is to indicate the base case for the DL/UL portions by a network. For example, the DL/UL portions may be indicated according to the minimum GP that is supported by the network. In this case, a UE with a larger GP length than the minimum GP may determine where an additional required GP is positioned, based on the indicated slot structure.

(ii) A second method is to indicate the worst case for the DL/UL portions by a network. For example, the DL/UL portions may be indicated according to the maximum GP supported by the network. In this case, separate mechanisms for using other resources (e.g., flexible) indicated by slot indication may be used for DL or UL for a UE with a smaller GP than the maximum GP.

In addition, it may be required to determine where a GP indicated by a slot type is positioned with respect to UEs with different GP lengths.

For example, a UE may assume that a GP is always ended after the DL portion. When slot 1 is dedicated for DL and slot 2 positioned after slot 1 is dedicated for UL, the GP may be positioned at the beginning of slot 2 dedicated for UL. When the minimum GP is indicated according to slot type indication, a UE with a larger GP than the minimum GP may reduce the UL portion to ensure an additional GP.

As another example, a UE may assume that a GP is always positioned before starting of the UL portion. When slot 1 is dedicated for DL and slot 2 is dedicated for UL, the GP may be positioned in a DL slot. When the minimum GP is indicated by slot type indication, a UE with a larger GP than the minimum GP may reduce the DL portion to ensure an additional GP.

Alternatively, a GP may be generated by dynamic scheduling only. For example, a UE may create a GP between ending of DL reception (e.g., ending of a control channel, ending of DL data, or ending of measurement) and starting of UL transmission. However, this method may complicate an operation of the UE. Accordingly, it may be more desirable to determine to insert a GP into ending of DL or starting of UL.

Based on the above discussion, it may be required to determine whether a slot structure indicated by a common PDCCH is formed assuming the best GP case or the worst GP case, which is supported by a network. In addition, the GP may be positioned after the DL portion or before the UL portion.

3. Handling of Different Numerologies and Different Slot Sizes

A slot size may be related to the numerology. When numerology of DL or UL is changed, an actual effect may be changed depending on a relationship between numerology used in slot type indication and numerology used in control/data transmission. The common PDCCH may indicate a slot type and numerology used as reference for slot type indication may be important to a UE.

For example, slot type indication may be transmitted base on the reference numerology. Based on the reference numerology, the UE may interpret the indicated slot type as numerology of the UE and may estimate a proper size of a slot irrespective of numerology used in the UE.

As another example, a common PDCCH may indicate a slot type using numerology of a UE. In this case, the UE may not need to re-estimate a slot type and a slot size. In this case, the common PDCCH may need to be UE-separately transmitted according to numerology.

However, as described above, a network may operate in one direction (e.g., DL/UL) at one time irrespective used numerology. Accordingly, it may be advantageous to transmit slot type indication based on the reference numerology. For example, when a network operates based on numerology with SCS of 15 kHz and 60 kHz and transmits slot type indication based on SCS of 15 kHz, a UE using SCS of 60 kHz may interpret a different number of DL portions (e.g., DL symbols) and UL portions (e.g., UL symbol) from indication based on symbol level alignment or slot level alignment.

Figures 2, 3:
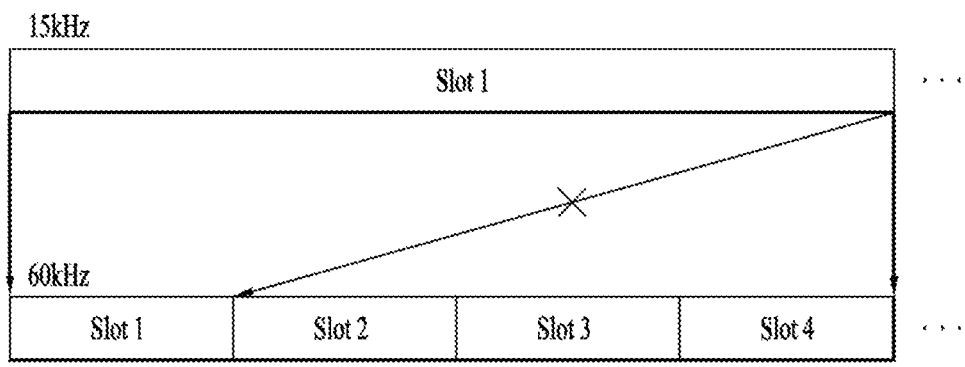
FIG. 2 illustrates 1 slot based on subcarrier spacing (SCS) of 15 kHz and 1 slot based on SCS of 60 kHz.
FIG. 3 illustrates combinations of slot formats according to an embodiment of the present invention.

As a detailed example, FIG. 2 illustrates 1 slot based on SCS of 15 kHz and 1 slot based on SCS of 60 kHz. That is, 1 symbol duration (i.e., time duration) based on SCS of 15 kHz may be the same as 4 symbol durations based on SCS of 60 kHz. Assuming that slot format indication based on SCS of 15 kHz indicates a slot forma having [Symbol 0=DL, Symbol 2=DL . . . , Symbol 13=UL], a UE that operates based on SCS of 60 kHz may interpret Symbol 0=DL as 4 consecutive DL symbols, may interpret Symbol 2=DL as 4 consecutive DL symbols, and may interpret Symbol 13=UL as 4 consecutive UL symbols (e.g., symbol level alignment). According to slot level alignment, a slot having an indicated format may be interpreted to be repeated four times.

Such SCS of 15 kHz and 60 kHz is exemplary and the same method may be applied to various SCSs that have been aforementioned with reference to Table 1 above. For example, when SCS 1 is A kHz, SCS 2 is B kHz, and a relationship of B=A*M is satisfied (where A, B, and M being a natural number), 1 OFDM symbol length based on SCS 1 may be the same as M OFDM symbol lengths based on SCS 2.

A group common PDCCH may indicate a slot format based on the reference numerology irrespective actual numerology used in a UE.

The reference numerology may be indicated by a network (e.g., RRC signaling) or pre-configured. For example, the minimum SCS among various SCSs configured for UEs by the network may be used as the reference numerology.

4. UE Operation Related to Periodic Resource Configuration

In general, NR may be targeted to avoid always on signal or periodic transmissions, some periodic configurations may be required for some operations. For example, a synchronization signal (SS) block, a PRACH configuration, a CSI-RS configuration, an RRM-RS configuration, and/or grant-free resources may be periodically configured.

In terms of UE performance, it may be desirable to ensure semi-statically configured resources. However, in terms of flexibility, dynamic resource switching between DL/UL/Reserved may be limited. In consideration of such advantages and disadvantages, the two following approaches may be considered.

(i) For example, when a semi-static configuration is provided, a UE may assume that resources are used according to a corresponding configuration. For example, a group common PDCCH may be defined not to change a type of a resource configured by a semi-static configuration. This method may be advantageous to enhance UE performance and to simplify a fallback operation.

(ii) As another example, a resource indicated by a semi-static configuration may be considered as a potential candidate of a semi-static resource. When a group common PDCCH is not activated, a potential candidate may be assumed to be ensured. When the group common PDCCH is activated, the semi-static resource may be used only when being checked by the group common PDCCH. According to this method, it may be advantageous to enhance network flexibility. However, even if a slot type is not changed in a fallback configuration that is semi-statically configured, it may be required to transmit the group common PDCCH and, thus, signaling overhead may be increased.

In consideration of advantage/disadvantage of (i) and (ii), the semi-static resource may distinguish between a first group and a second group, the first group may comply with operation (i), and the second group may comply with the operation (ii). Minimum UE performance on measurement and minimum opportunities for a PRACH may be ensured through the first group and the second group may be used in an on-demand manner.

A common PDCCH may override at least a portion of a semi-statically configured resource. Semi-static configurations having different priority from the common PDCCH, for example, a guaranteed resource and a flexible resource may be considered.

<Slot Format Indicator (SFI) for Different Numerology>

As described above, a slot format indicated through a group common PDCCH may include downlink (D), unknown (X), and/or uplink (U) symbols.

A plurality of slot formats may configure various combinations and a combination(s) of slot formats may be configured for a UE via higher layer signaling or the like.

A plurality of numerologies may be configured for a UE. An SFI of the group common PDCCH may indicate an index of a slot format table (or slot format combinations/sets) configured or the UE. When a plurality of BWPs and a plurality of numerologies are configured for 1 UE, there may be a method of indicating slot formats for respective numerologies. For example, numerologies may be separately configured for respective BWPs and, in this case, slot formats may be indicated for the respective BWPs.

1. UE Slot Format Table for Multi-Numerology (1) Single Column Table

A slot format table configured for a UE may be a set of slot formats of a plurality of numerologies.

For example, when SCS configured for a UE is 15 and 30 kHz and the slot format table configured for the UE includes 16 of total entries, entries #1 to #8 may correspond to slot formats of SCS of 15 kHz and entries #9 to #16 may correspond to slot formats of SCS of 30 kHz. An SFI of a group common PDCCH may indicate a slot format index appropriate for numerology used by the UE.

When a plurality of BWPs is activated in a UE and the respective BWPs have different numerologies, slot formats of the plurality of BWPs may be indicated through one SFI. For example, index offset between slot formats to be applied to numerologies may be used to indicate slot formats of a plurality of BWPs through 1 SFI.

Like in the above example, it may be assumed that, when SCS configured for a UE is 15 and 30 kHz and the slot format table configured for the UE includes 16 of total entries, entries #1 to #8 correspond to slot formats of SCS of 15 kHz and entries #9 to #16 correspond to slot formats of SCS of 30 kHz. In this case, when an SFI indicates one index of #1 to #8, a UE may acquire a slot format without change using an index of the SFI in a BWP of SCS of 15 kHz but may interpret an index of SFI+8 in a BWP of SCS of 30 kHz (i.e., index offset 8 is applied) to acquire a slot format of a BWP of SCS of 30 kHz.

(2) Multiple Column Table

A mother table that is a reference of a slot format table configured for a UE or a slot format table configured for the UE may correspond to a set of slot formats of a plurality of numerologies.

For example, as shown in Table 4, columns may be defined for respective numerologies and columns may define slot formats appropriate for the corresponding numerologies.

TABLE 4

|  | 15 kHz SCS | 30 kHz SCS | 60 kHz SCS | 120 kHz SCS | ... |
|---|---|---|---|---|---|
| Slot format 1 | ... | ... | ... | ... | ... |
| Slot format 2 | ... | ... | ... | ... | ... |
| ... | | | | | |
| Slot format N | ... | ... | ... | ... | ... |

When a plurality of BWPs is activated in a UE and the respective BWPs have different numerologies, even if one SFI is indicated, a UE may recognize slot formats of respective numerologies in a row corresponding to the SFI.

2. Automatic Slot Format Expansion/Reduction

As another example of the present invention, a UE slot format table of one numerology (e.g., reference numerology) may be defined and a rule may be defined to expand or reduce the corresponding table according to numerology. In this case, it may not be required to numerology-separately indicate a slot format by a network and, thus, signaling overhead may be advantageously reduced.

(1) Expansion Rule

When a UE uses larger SCS than reference SCS as a reference of the UE slot format table, the number of UE SCS-based slots may be increased compared with the number of reference SCS-based slots included for the same time duration. For example, 4 slots based on reference SCS of 15 kHz may have the same time duration as 8 slots based on SCS of 30 kHz. Accordingly, the UE needs to expand a slot format indicated based on the reference SCS according to SCS used by the UE. Here, expansion of a slot format refers to expansion of the number of symbols included in a slot but does not refer to expansion of absolute time duration. For example, when the network indicates time direction of 0.5 ms including 14 symbols, the UE may be interpreted to be expanded to include 28/56/ . . . symbols in the same time duration of 0.5 ms.

Option 1: Downlink (D), unknown (X), and uplink (U) directions of symbols of respective slot formats indicated by the reference SCS may be maintained contains for time duration occupied by the corresponding slot format. For example, it may be assumed that the reference SCS is 15 kHz and a slot format indicated by the reference SCS includes 4 D symbols, 6 X symbols, and 4 U symbols and SCS used by the UE is 30 kHz. In this case, the 4 D symbols, the 6 X symbols, and the 4 U symbols, included in the indicated slot format, may be expanded to 8 D symbols, 12 X symbols, and 8 U symbols, respectively, with respect to a UE that operates based on SCS of 30 kHz. That is, time duration of 4 D symbols based on SCS of 15 kHz is the same as time duration of 8 D symbols based on SCS of 30 kHz and, thus, the UE may interpret 4 D symbols indicated based on SCS of 15 kHz to 8 D symbols based on SCS of 30 kHz. In this case, the number of D symbols may be expanded but the sum of time durations of D symbols in a slot may be maintained contain. The UE may interpret X symbols and U symbols in the same manner.

Option 2-1: When a UE expands each D symbol and each U symbol, different rules may be applied according to whether an X symbol is present before and after a corresponding symbol. For example, when a D symbol, a rear portion of which is an X symbol, is expanded as the case in which SCS used by the UE is equal to or greater than twice the reference SCS, the UE may configure ½ of a rear portion of the expanded D symbol as X. When a U symbol, a front portion of which is an X symbol, is expanded, the UE may configure ½ of a front portion of the expanded U symbol as X. For example, when the reference SCS is 15 kHz and the number of D symbols, X symbols, and U symbols is 4, 6, and 4, respectively, 4 D symbols may be expanded to 4 D symbols+4 X symbols based on SCS of 30 kHz. 6 indicated X symbols may be expanded to 12 X symbols. 4 indicated U symbols may be expanded to 4 X symbols+4 U symbols based on SCS of 30 kHz. As a result, a slot format may be interpreted as 4 D symbols+20 X symbols+4 U symbols. Accordingly, time duration corresponding to an X symbol may be further increased compared with the indicated slot format.

Option 2-2: When SCS used by a UE is equal to or greater than 4 times the reference SCS and a D symbol, a rear portion of which is an X symbol, is expanded, a UE may configure ¼ of a rear portion of the expanded D symbol as an X symbol. When a U symbol, a front portion of which is an X symbol, is expanded, ¼ of a front portion of the expanded U symbol may be configured as an X symbol.

Option 2-3: When SCS used by a UE is equal to or greater than 8 times the reference SCS and a D symbol, a rear portion of which is an X symbol, is expanded, a UE may configure ⅛ of a rear portion of the expanded D symbol as an X symbol. When a U symbol, a front portion of which is an X symbol, is expanded, ⅛ of a front portion of the expanded U symbol may be configured as an X symbol.

Option 2-4: When SCS used by a UE is equal to or greater than 16 times the reference SCS and a D symbol, a rear portion of which is an X symbol, is expanded, a UE may configure ¹⁄₁₆ of a rear portion of the expanded D symbol as an X symbol. When a U symbol, a front portion of which is an X symbol, is expanded, ¹⁄₁₆ of a front portion of the expanded U symbol may be configured as an X symbol.

Option 3-1: When SCS used by a UE is equal to or greater than twice the reference SCS and an X symbol is expanded, a format of the expanded X symbol may also be differently determined according to whether D/U symbols are present before and after the X symbol. For example, when an X symbol, a front portion of which is a D symbol, is expanded, the UE may configure ½ of a front portion of the expanded X symbol as a D symbol. In addition, when an X symbol, a rear portion of which is a U symbol, is expanded, the UE may configure ½ of a rear portion of the expanded X symbol as a U symbol.

Option 3-2: When SCS used by a UE is equal to or greater than 4 times the reference SCS and an X symbol is expanded, a format of the expanded X symbol may also be differently determined according to whether D/U symbols are present before and after the X symbol. For example, when an X symbol, a front portion of which is a D symbol, is expanded, the UE may configure ¼ of a front portion of the expanded X symbol as a U symbol. In addition, when an X symbol, a rear portion of which is a U symbol, is expanded, the UE may configure ¼ of a rear portion of the expanded X symbol as a U symbol.

Option 3-3: When SCS used by a UE is equal to or greater than 8 times the reference SCS and an X symbol is expanded, a format of the expanded X symbol may also be differently determined according to whether D/U symbols are present before and after the X symbol. For example, when an X symbol, a front portion of which is a D symbol, is expanded, the UE may configure ⅛ of a front portion of the expanded X symbol as a U symbol. In addition, when an X symbol, a rear portion of which is a U symbol, is expanded, the UE may configure ⅛ of a rear portion of the expanded X symbol as a U symbol.

Option 3-4: When SCS used by a UE is equal to or greater than 16 times the reference SCS and an X symbol is expanded, a format of the expanded X symbol may also be differently determined according to whether D/U symbols are present before and after the X symbol. For example, when an X symbol, a front portion of which is a D symbol, is expanded, the UE may configure ¹⁄₁₆ of a front portion of the expanded X symbol as a U symbol. In addition, when an X symbol, a rear portion of which is a U symbol, is expanded, the UE may configure ¹⁄₁₆ of a rear portion of the expanded X symbol as a U symbol.

(2) Reduction Rule

When a UE uses smaller SCS than reference SCS, a smaller number of slots/symbols than the number indicated based on the reference SCS may be present for the same time duration. For example, 8 slots based on reference SCS of 30 kHz may have the same the same time duration as 4 slots based on SCS of 15 kHz. Accordingly, the UE needs to expand a slot format indicated based on the reference SCS according to SCS used by the UE.

Option 1-1: When SCS (hereinafter, UE SCS) used by a UE is smaller than the reference SCS and even one of D or U is present in a symbol set of the reference SCS to be reduced to 1 symbol of the UE SCS, the corresponding symbol set may be interpreted as one D symbol or U symbol based on the UE SCS.

Option 1-2: When the UE SCS is small and is equal to or less than ½ times the reference SCS and a portion of D or U in a symbol set of the reference SCS to be reduced to 1 UE SCS symbol is equal to or greater than ½, the corresponding symbol set may be configured to be a D or U symbol of the UE SCS. When the portion of D or U is less than ½, the corresponding symbol set may be configured to be an X symbol of the UE SCS. For example, when a slot format DDDXXXXXXXXUUU based on reference SCS of 30 kHz is indicated, 2 symbols such as |DD|DX|XX|XX|XX|XU|UU| may be grouped to define 1 symbol of UE SCS of 15 kHz. |DX| may be converted into D and |XU| may be converted into U. A slot format DDDXXXXXXXXUUU based on SCS of 30 kHz may be converted into a slot format DDXXXUU based on UE SCS of 15 kHz.

Option 1-3: When the UE SCS is small and is equal to or less than ¼ times the reference SCS and a portion of D or U in a symbol set of the reference SCS to be reduced to 1 UE SCS symbol is equal to or greater than ¾, the corresponding symbol set may be configured to be a D or U symbol of the UE SCS. When the portion of D or U is less than ¾, the corresponding symbol set may be configured to be an X symbol of the UE SCS.

Option 1-4: When the UE SCS is small and is equal to or less than ⅛ times the reference SCS and a portion of D or U in a symbol set of the reference SCS to be reduced to 1 UE SCS symbol is equal to or greater than ⅞, the corresponding symbol set may be configured to be a D or U symbol of the UE SCS. When the portion of D or U is less than ⅞, the corresponding symbol set may be configured to be an X symbol of the UE SCS.

Option 1-5: When the UE SCS is small and is equal to or less than ¹⁄₁₆ times the reference SCS and a portion of D or U in a symbol set of the reference SCS to be reduced to 1 UE SCS symbol is equal to or greater than ¹⁵⁄₁₆, the corresponding symbol set may be configured to be a D or U symbol of the UE SCS. When the portion of D or U is less than ¹⁵⁄₁₆, the corresponding symbol set may be configured to be an X symbol of the UE SCS.

Option 2-1: When the UE SCS is smaller than the reference SCS and even one X is present in a symbol set of the reference SCS to be reduced to 1 symbol of the UE SCS, the corresponding symbol set may be converted into an X symbol of the UE SCS.

Option 2-2: When the UE SCS is small and is equal to or less than ½ times the reference SCS, a symbol set of the reference SCS to be reduced to 1 symbol of the UE SCS includes D and X or X and U, and a portion of X in the symbol set is equal to or greater than ½, the corresponding symbol set may be configured to be an X symbol of the UE SCS. When the portion of X in the symbol set is less than ½, the corresponding symbol set may be configured to be a D or U symbol of the UE SCS.

Option 2-3: When the UE SCS is small and is equal to or less than ¼ times the reference SCS, a symbol set of the reference SCS to be reduced to 1 symbol of the UE SCS includes D and X or X and U, and a portion of X in the symbol set is equal to or greater than ¾, the corresponding symbol set may be configured to be an X symbol of the UE SCS. When the portion of X in the symbol set is less than ¾, the corresponding symbol set may be configured to be a D or U symbol of the UE SCS.

Option 2-4: When the UE SCS is small and is equal to or less than ⅛ times the reference SCS, a symbol set of the reference SCS to be reduced to 1 symbol of the UE SCS includes D and X or X and U, and a portion of X in the symbol set is equal to or greater than ⅞, the corresponding symbol set may be configured to be an X symbol of the UE SCS. When the portion of X in the symbol set is less than ⅞, the corresponding symbol set may be configured to be a D or U symbol of the UE SCS.

Option 2-5: When the UE SCS is small and is equal to or less than ¹⁄₁₆ times the reference SCS, a symbol set of the reference SCS to be reduced to 1 symbol of the UE SCS includes D and X or X and U, and a portion of X in the symbol set is equal to or greater than ¹⁵⁄₁₆, the corresponding symbol set may be configured to be an X symbol of the UE SCS. When the portion of X in the symbol set is less than ¹⁵⁄₁₆, the corresponding symbol set may be configured to be a D or U symbol of the UE SCS.

Option 3: When the UE SCS is smaller than the reference SCS and a symbol set of the reference SCS to be reduced to 1 SCS symbol includes all of D, X, and U, the corresponding symbol set may be configured to be an X symbol of the UE SCS.

Option 4-1: When the UE SCS is smaller than the reference SCS and D and U are mixed in a symbol set of the reference SCS to be reduced to 1 SCS symbol, the corresponding symbol set may be configured as an X symbol of the UE SCS.

Option 4-2: When the UE SCS is smaller than the reference SCS and D and U are mixed in a symbol set of the reference SCS to be reduced to 1 SCS symbol, the UE may recognize the corresponding symbol set as an error and may disregard a slot format of a slot included in the corresponding symbol set.

(3) Default of Reference Numerology

There may be various methods of notifying a UE about reference numerology to configure reference numerology by a network.

Option 1: For example, when notifying a UE about a slot format table (e.g., combinations of slot formats), the network may also notify the UE about reference numerology referred to by the slot format table.

However, when default reference numerology is defined and a slot format table based on default reference numerology is used, the network may not separately notify the UE about reference numerology.

The default reference numerology may be defined, for example, as follows but is not limited thereto. (i) Smallest numerology among numerologies configurable for a UE may be selected as default reference numerology. For example, assuming that SCS of numerology configurable for the UE is 15, 30, 60, and 120 kHz, the network may define 15 kHz as default reference numerology. (ii) Largest numerology among numerologies configurable for a UE may be selected as default reference numerology. For example, assuming that SCS of numerology configurable for the UE is 15, 30, 60, and 120 kHz, the network may define 120 kHz as default reference numerology. (iii) As another example, 15 kHz may be fixed to default reference numerology.

Option 2: As another example, the network may define numerology of a control channel used to indicate an index in a slot format table configured for the UE as reference numerology.

Option 3: As another example, numerology of a band in which a corresponding slot format is actually to be used may be defined as reference numerology.

3. Inherits Earlier SFI

The method of converting a slot format depending on SCS of a UE by the UE when a slot format is transmitted based on the reference SCS (or reference numerology) has been described above.

When a carrier is changed after the UE applies a specific SFI and numerology of the changed BWP/carrier is different from previous BWP/carrier, whether the specific SFI is re-applied by the UE may be issued according to the aforementioned slot format conversion rule.

Option 1: For example, when numerology of the changed BWP/carrier is different a previous BWP/carrier, the UE may disregard a pre-indicated slot format and may perform a fallback operation up to a next SFI from a time point in which the BWP/carrier is changed.

Option 2: As another example, when numerology of the changed BWP/carrier is different a previous BWP/carrier, the UE may apply a slot format that is modified according to the changed numerology up to a next SFI from a time point in which the BWP/carrier is changed. However, in the case of a format that is not supported by the modified slot format, the UE may disregard the corresponding slot format and may perform a fallback operation.

4. Inherits Earlier SFI in Beam Switching

A plurality of beams may be configured for a UE and, as necessary, beam switching may occur. As such, when a beam is switched, the UE may need to select whether an existing applied SFI is applied to a new beam without change.

Option 1: The UE may disregard an existing slot format up to a next SFI from a time point in which beam switching occurs and may perform a fallback operation.

Option 2: The UE may comply with an existing slot format up to a next SFI from a time point in which beam switching occurs. When numerology of the switched is different a previous beam, the UE may apply a slot format modified according to the changed numerology. However, in the case of a format that is not supported by the modified slot format, the UE may disregard the corresponding slot format and may perform a fallback operation.

5. Defining Reference Numerology

To perform a method of modifying a slot format according to numerology as described above, it may be important to define reference numerology. When numerologies of scheduling/scheduled carriers are the same in cross-carrier scheduling, there may be no problem to apply the aforementioned slot format modification rule. However, a plurality of BWPs may be configured for respective carries and numerologies may be different for the respective BWPs.

When an SFI is defined/signaled for each cell (i.e., carrier) in a group common PDCCH transmitted through a PCell, it may be required to define reference numerology of a SFI for each cell.

For example, in the case of the PCell, numerology for transmitting the group common PDCCH may correspond to reference numerology.

In the case of a SCell, the following options may be considered.

Option 1: A slot format may be indicated based on numerology of a currently activated BWP.

Option 2: Numerology of a first activated BWP in the SCell may be defined as reference numerology of the SCell.

Option 3: Numerology of a default BWP of the SCell may be defined as reference numerology of the SCell.

<Slot Format Indication for Multi-Band>

Slot format indication may be mainly used in a TDD environment but may be used to indicate a slot format in an FDD band. Each band of the FDD may be generally fixed to D or U but a network may permit each band of the FDD to be used for other use through 'Unknown'. In this case, the network needs to indicate a slot format of D Band and U Band in a FDD and, thus, there is a need for a method therefor.

In an LTE-NR coexistence environment, a network may allocate supplementary uplink (SUL) that temporally use an LTE UL band to an NR user for an additional UL band of an NR user. In this case, when the NR user operates in a TDD, the network needs to simultaneously indicate a slot format of an NR TDD band and a slot format of SUL.

Such a method of simultaneously indicating a slot format for two or more bands is described below.

1. Single Column Table

For example, a table in which slot formats of two or more bands (e.g., BWPs) are contiguously deployed in one line may be defined/configured.

FIG. 3 illustrates combinations of slot formats according to an embodiment of the present invention.

For example, when a slot format of Band1 is represented as SF1 and a slot format of Band2 is represented as SF2, a slot format group transmitted to a UE by a network may has the form of SF1+SF2+ . . . . The slot format group may be one entry in the slot format table and such entries may be grouped to configure the slot format table.

The network may configure combination(s) of slot formats corresponding to the slot format table for the UE via higher layer signaling and, then, may notify the UE about a slot format combination of a specific entry through a group common PDCCH.

In addition, SCS may be different for each band even in one entry. Accordingly, the numbers of slots of respective SFs may also be different.

The slot format table may be configured in such a way that slots corresponding to the same specific time duration are contiguously deployed among slot formats of respective bands and, then, slots corresponding to next the same time duration are contiguously deployed.

For example, it may be assumed that numerology of Band 1 is SCS of 60 kHz and numerology of Band 2 is SCS of 15 kHz. Band 1 may have 4 slots and Band 2 may have 1 slot for 1 ms. When time duration of a slot format to be notified to a UE by a network is 2 ms, the number of slots of Band1 is 8 for 2 ms and the number of slots of Band2 is 2 for 2 ms. In this case, the network may deploy slots formats of 2 bands in the form of 1 slot of 4 slots of Band1+1 slot of Band2+4 slots of Band1+1 slot of Band2.

For example, the network may deploy 1 slot of 4 slots+1 slot of Band2, which corresponds to the same time duration of 1 ms, and, then, may deploy 4 slots of Band1+1 slot of Band2, which correspond to next time duration of 1 ms.

Such slot format deployment may be performed irrespective of the number of bands.

FIG. 4 illustrates combinations of slot formats according to another embodiment of the present invention. For convenience, it may be assumed that the number of bands is 2 or 3 in FIG. 4. For example, in the case of entry 2, Band 1, Band 2, and Band 3 have the same SCS. In the case of entry 4, it may be assumed that SCS of Band 2 is twice SCS of Band 1 and SCS of Band 1 is twice SCS of Band 3.

The method of FIG. 3 or 4 may be used when a network indicates slots corresponding to the same time duration with respect to a plurality of bands at one time.

2. Multi-Column Table

FIGS. 5 and 6 illustrate combinations of slot formats according to another embodiment of the present invention.

Slot formats of a plurality of bands may be contiguously deployed in one column as illustrated in FIG. 3 or 4 but, according to another embodiment of the present invention, a column may be defined for each band and a slot format may be indicated.

3. Multi-Bands Supporting Multi-Numerology

The method of indicating a slot form of all numerologies to be supported by one band through one slot format table has been described above with regard to embodiments related to Table 4 above. The method of indicating slot formats of a plurality of bands through one slot format table has been described with regard to the embodiments related to FIGS. 3 to 6.

The above embodiments may also be combined to consider a method of simultaneously indicating slot formats of all numerologies to be supported for each of the plurality of bands. For example, an embodiment may be formed by combining the embodiments related to Table 4 above and the embodiments related to FIGS. 3 to 6.

For example, a column may be defined for each band and a sub-column may be defined for numerologies of respective bands and, thus, a network may indicate slot formats for respective numerologies of a plurality of bands in one row at one time.

FIG. 7 illustrates a combination of slot formats according to an embodiment of the present invention.

In FIG. 7, the number of bands and the number of numerologies of the respective bands may be changed as one example. As the number of bands and/or the number of numerologies of the respective bands are increased, a size of the illustrated slot format table may also be increased.

4. Reference Numerology Setting

When slot formats of a plurality of bands are indicates using one table, numerology of each band needs to be considered. This is because a method of indicating slot formats of respective bands is changed according to determined reference numerology. Each band may be any one of, for example, a DL band, a UL band, a SUL band, and a TDD band but is not limited thereto.

Considered methods are described below.

Option 1: A slot format indicated by a slot format table may be a slot format according to numerology of each band. For example, when Band1 is SCS of 30 kHz and Band2 is SCS of 15 kHz, a slot format of each band may be defined as a slot format for SCS of 30 kHz and a slot format for SCS of 15 kHz. When slot formats for SCS of 30 kHz/SCS of 15 kHz are inserted into a table, a combination of slot formats of SCS of 30 kHz/SCE of 15 kHz or a slot format column for each band may be deployed.

Option 2: A slot format may be indicated based on smallest numerology among numerologies of a plurality of bands. A UE may modify a slot format indicated according to numerology of each band using the aforementioned slot format expansion method.

Option 3: A slot format may be indicated based on largest numerology among numerologies configured for a plurality of band.

Option 4-1: Reference numerology may be separately defined and a slot format of each band may be indicated based on the reference numerology.

Option 4-2: Reference numerology may be separately defined and slot formats of only some bands may be indicated based on the reference numerology. A slot format according to numerology of a corresponding band may be indicated for the other band(s). For example, some bands to which the reference numerology is applied may be at least one of a DL band, a UL band, a SUL band, and a TDD band.

Reference numerology in Options 4-1 and 4-2 may be determined using the aforementioned method of determining reference numerology.

While the proposed methods may be implemented independently, some proposed methods may be combined (or integrated). It may be regulated that information indicating whether the proposed methods are applied or not (or information about rules of the proposed methods) is transmitted to a UE in a predefined signal (e.g., a physical-layer signal or a higher-layer signal) by a base station.

<Group Common PDCCH>

Hereinafter, the content and expected payload size of DCI transmitted through a group common PDCCH are described.

A signaling method of the group common PDCCH is described now. An example of the signaling method may include a method of allocating and transmitting a reserved resource and a method of configuring and transmitting a search space.

When information on a slot type is transmitted through the group common PDCCH, whether a method of transmitting a slot type to a UE that operates with a plurality of CCs is effective is described below.

1. Contents of Group Common PDCCH (1) Slot Format Indication

The group common PDCCH may be used to notify a UE about a slot format. The slot format may be indicated in various types. A payload size of the group common PDCCH may be variable according to a type of an indicated slot format.

A size of 1 slot (e.g., length in the time domain) may be changed according to numerology. The number of slots configuring 1 slot may be changed according to numerology.

(i) Slot Type

The group common PDCCH may indicate a type of at least one slot.

For example, a slot may be classified as shown in Table 5 below but is not limited thereto.

TABLE 5

| Slot | Description |
| --- | --- |
| D only | Slot in which only downlink is supported |
| U only | Slot in which only uplink is supported |
| D-centric | Slot in which downlink is supported in most symbols configuring slot |
| U-centric | Slot in which uplink is supported in most symbols configuring slot |
| Data region (DR) | Slot used for other data but not UE specific data like in MBSFN subframe |
| Reserved | Slot occupied by a network as necessary but not UE specific use |

In the case of D-centric and U-centric slot types, only whether a corresponding slot is D-centric or U-centric may be indicated and, thus, a configuration (e.g., downlink and uplink) of an actual symbol included in the corresponding slot needs to be predefined. A DL/UL portion in a D/U-centric slot may be predefined or may be configured by a network. One or more D/U-centric patterns may be present according to a DL/UL resource configuration.

Use of the reserved/DR slot may be predefined or not. For example, the use of the reserved/DR slot may be predefined via system information, higher layer indication, or the like. When the use of a reserved/DR slot is not defined, a network may simultaneously notify a UE about the use while indicating a slot type through the group common PDCCH or may not indicate the use if it is not required for the UE to know the use of the reserved/DR slot. The reserved resource may be separately configured from a slot type. For example, the network may configure a reserved resource via dynamic/semi-static signaling.

(ii) Slot Type Pattern

A group common PDCCH may indicate a type of a plurality of slots. For example, the group common PDCCH may indicate at least one of combinations of a plurality of slots. When a network indicates respective types of a plurality of slots one by one, it may be ineffective that a payload size of the group common PDCCH is increased and signaling overhead is increased. Accordingly, the number of slots to be indicated and each slot type may be defined as one pattern, and the network may notify the UE about an index of the pattern through the group common PDCCH.

A plurality of slot type patterns may be defined. For example, the slot type pattern may be defined as [periodicity/slot types or patterns or a set of slot types] but is not limited thereto.

Figure 8:
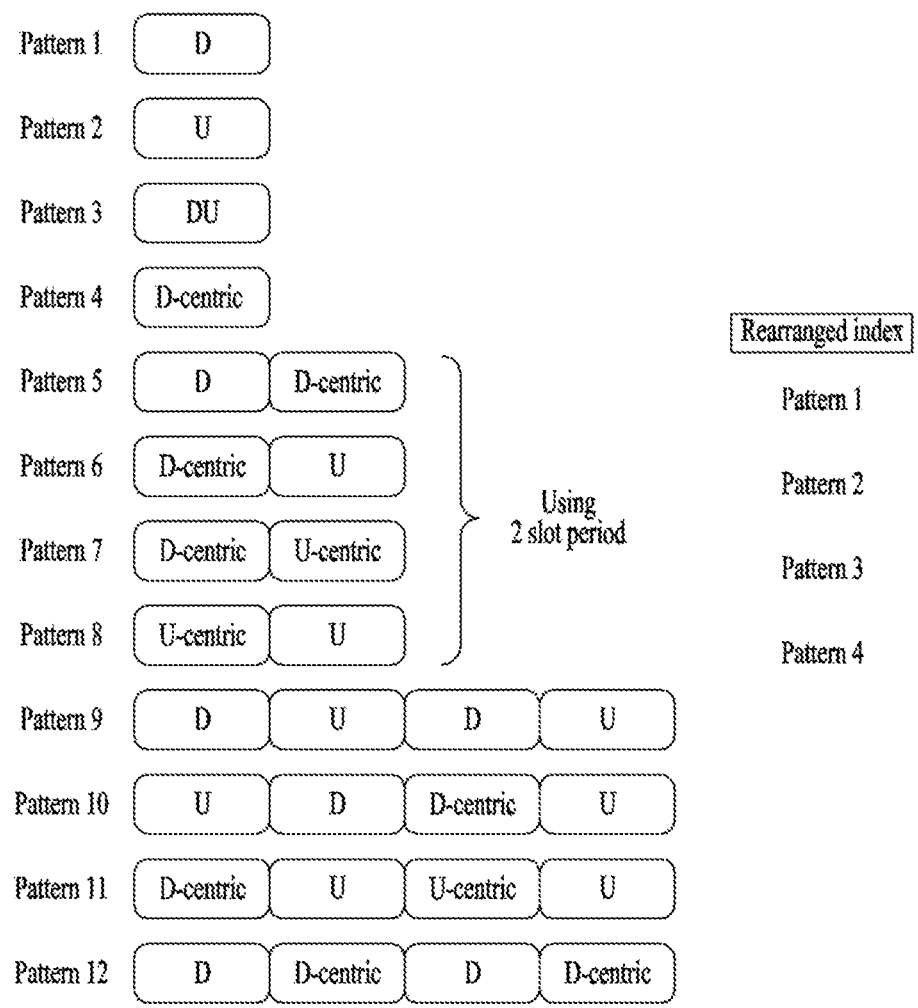
FIG. 8 illustrates patterns of slot formats according to an embodiment of the present invention.

FIG. 8 illustrates patterns of slot formats according to an embodiment of the present invention. In FIG. 8, DU refers to a symbol, a half of which is D symbols and the other half of which is U symbols.

In the case of an FDD system, a slot corresponding to D in FIG. 8 may correspond to a slot format of a DL band (e.g., DL BWP) and a slot corresponding to U in FIG. 8 may be interpreted as a slot format of a UL band (e.g., UL BWP). For example, a configuration of a pattern obtained by combining a D slot format and a U slot format for a UE by a base station may be interpreted as a configuration of a pattern obtained by combining a slot format of a DL band (e.g., DL BWP) and a slot format of a UL band (e.g., UL BWP) for the UE by the base station.

A plurality of slot type patterns to be used in a corresponding cell or a corresponding group may be defined/configured and a network may notify a UE about patterns to be used among a plurality of slot type patterns. For example, a subset may be signaled to the UE among defined patterns. FIG. 8 illustrates 12 of total patterns and, in this case, information indicating that patterns #5 to #8 defined using 2 slot sections among 12 patterns are available may be signaled to the UE. In this case, 4 patterns #5 to #8 may be re-indexed and may be considered as patterns #1 to #4.

As such, when a subset of slot type patterns is pre-notified to the UE, the network may sequentially transmit only the indexes of the re-indexed patterns to the group common PDCCH. Accordingly, signaling overhead of the group common PDCCH may be reduced. For example, the group common PDCCH may not inevitably cover all 12 patterns and may be configured to cover 4 patterns and, in this case, a payload size of the group common PDCCH may be reduced.

Information on the subset of the slot type patterns may be transmitted to the UE through a MAC control element (CE) or may be transmitted through the group common PDCCH. Alternatively, the network may predefine a period in which a pattern is to be indicated through system information. Alternatively, information on a subset of slot type patterns may be transmitted via UE-specific higher layer signaling.

A pattern of a long period may be defined in the form in which patterns of short periods are repeated. In this case, in a situation in which the network needs to simultaneously indicate two slot formats, pattern information on the long period may be advantageously replaced with pattern information on the short period.

(iii) Symbol Unit Indication

According to another embodiment of the present invention, a group common PDCCH may indicate a slot type in units of symbols configuring a slot. For example, a resource type such as D/U/Reserved in Table 6 below may be applied in units of symbols.

Table 6 below shows an exemplary slot format under the assumption that 1 slot includes 7 symbols.

TABLE 6

| Slot Format | Symbol 0 | Symbol 1 | Symbol 2 | Symbol 3 | Symbol 4 | Symbol 5 | Symbol 6 |
|---|---|---|---|---|---|---|---|
| 1 | D | D | D | D | U | U | U |
| 2 | D | D | R | R | R | R | U |
| 3 | D | U | U | U | U | U | U |
| 4 | D | D | DR | DR | DR | DR | DR |
| ... | | | | | | | |

(iv) Symbol Pattern

Although the method of indicating an index of a slot pattern by a group common PDCCH has been described above, the group common PDCCH may indicate an index of a symbol pattern according to another embodiment of the present invention.

[Table 7]

Table 7 below shows an exemplary symbol pattern (or slot format) under the assumption 1 slot includes 7 symbols.

TABLE 7

| Symbol Pattern | Symbol 0 | Symbol 1 | Symbol 2 | Symbol 3 | Symbol 4 | Symbol 5 | Symbol 6 |
|---|---|---|---|---|---|---|---|
| 1 | D | D | D | R | R | U | U |
| 2 | D | DR | DR | DR | U | U | U |
| 3 | R | R | R | R | R | U | U |
| ... | | | | | | | |

(2) Other Information

The group common PDCCH may further include other information in addition to slot format information.

(i) Puncturing Indication: The group common PDCCH may include puncturing information for URLLC. A period used as the URLLC may be indicated in units of slots or in units of symbols.

(ii) Semi-Static Resource Information: The group common PDCCH may include information on a semi-static resource such as CSI-RS. For example, the group common PDCCH may indicate information on what is a corresponding semi-static resource or information on a period, transmission time duration, and the like when the corresponding semi-static resource has the period.

2. Transmission of Group Common PDCCH

As a method of transmitting a group common PDCCH by a network, a method of configuring and transmitting a search space for the group common PDCCH and a method of ensuring and transmitting a reserved resource for the group common PDCCH may be considered.

(1) Transmission of Group Common PDCCH Using Reserved Resource

A network may pre-ensure a resource (e.g., RE, REG, RB, and CCE) in which a group common PDCCH is to be transmitted.

The group common PDCCH may also be a control channel and, thus, may be deployed on a CORESET. In addition, it may be desirable to deploy a position of the reserved resource for the group common PDCCH to minimize blocking with other control channels. In particular, the group common PDCCH may avoid blocking with a CSS to a maximum degree.

When a position in a logical domain, in which a control channel is transmitted, is defined, a logical position of the reserved resource for the group common PDCCH may be immediately before or behind the CSS. Alternatively, the reserved resource for the group common PDCCH may be positioned at the last portion of a CORESET or may be positioned to be spaced apart from a start index or end index of the CSS by predetermined offset. In this case, the offset may be different for each cell/group. The offset may be notified to a UE via system information, higher layer signaling, or the like.

Alternatively, the resource for the group common PDCCH may be deployed in the CSS. In this case, a size of the group common PDCCH may be equal to or less than a size of a smallest candidate among control channel candidates in the CSS. In this case, the reserved resource for the group common PDCCH may be included in the candidate of the CSS and, in this regard, the UE may basically perform blind detection (DB) on the CSS irrespective of whether the group common PDCCH is detected in the reserved resource in the CSS.

A position of the reserved resource for the group common PDCCH may be notified to the UE via system information, higher layer signaling, or the like. When the group common PDCCH is transmitted through a candidate on the CSS, the number of available candidates may be reduced to transmit PDCCH (e.g., common control information but not a group common PDCCH) in the CSS, which causes a similar result to CSS blocking. Accordingly, when the group common PDCCH is configured in a CSS, the UE may assume that a candidate, to which the group common PDCCH is mapped, is not used as a CSS candidate of another channel and may assume the candidate to be an invalid candidate. The UE may skip blind detection on the invalid candidate and may proceed to a next candidate. In addition, the group common PDCCH may be defined to be transmitted using a CSS like a general PDCCH and, in this case, a general blind detection procedure on the CSS may also be performed on the group common PDCCH in the same way.

FIG. 9 illustrates reserved resource allocation for a group common PDCCH according to an embodiment of the present invention. The group common PDCCH may be mapped to a block indicated by dotted lines in FIG. 9.

(a) of FIG. 9 illustrates the case in which a reserved resource for the group common PDCCH is allocated to a first candidate. Accordingly, a UE may omit blind detection of a general PDCCH with respect to the corresponding block.

(b) of FIG. 9 illustrates the case in which a reserved resource for the group common PDCCH is allocated to a next portion of the last candidate. (c) of FIG. 9 illustrates the case in which a reserved resource for the group common PDCCH is allocated to a position with predetermined offset from the last candidate.

(2) Transmission of Group Common PDCCH Through Search Space

A network may configure a search space in which a group common PDCCH is to be transmitted and a UE may perform blind detection in a corresponding search space to detect a group common PDCCH.

(i) With the G-RNTI

A search space in which a group common PDCCH is to be transmitted is referred to as a GSS. A radio network temporary identifier (RNTI) required for detection of the group common PDCCH in the GSS is referred to as a G-RNTI. For example, a CRC of the group common PDCCH may be scrambled or masked through the G-RNTI.

1 UE may have one or plural G-RNTIs. For example, one UE may be configured with one or plural GSSs. The GSS may be defined irrespective of the number thereof.

a. GSS in CSS

For example, a network may randomly deploy in a CSS. To deploy the GSS in the CSS, the size and/or the number of candidates of the GSS may be equal to or less than the size and/or the number of candidates of the CSS. Candidates of the GSS may be contiguously deployed or may be separately distributed and deployed.

When a size of a candidate of the GSS is the same as a size of a candidate of the CSS, a UE needs to additionally perform only CRS examination on the GSS (e.g., CRC examination through R-RNTI) while performing blind detection on the CSS and, thus, a problem in terms of overhead of additional blind detection due to additional deployment of the GSS may be overcome.

FIG. 10 illustrates a GSS deployed in a CSS according to an embodiment of the present invention.

An environment in which a size of a largest candidate among GSS candidates is equal to or smaller than a size of the smallest candidate of a CSS and the number of GSS candidates is equal to or less than a half of the number of CSS candidates may be considered.

b. GSS in CORESET

Similarly to a USS, a network may randomly deploy GSSs across a CORESET according to a hashing function using a G-RNTI. Candidates of a GSS may be contiguously deployed or may be separately distributed and deployed.

(ii) Without the G-RNTI a. GSS in CSS

A network may deploy a GSS in a CSS. The present embodiment is partially similar to the aforementioned method of deploying the GSS in the CSS but, according to the present embodiment, the network may form the GSS and may deploy the GSS in the CSS to reduce the possibility of blocking with a control channel to be transmitted in the CSS. The size/number of GSSs may be equal to or less than the size/number of CSS candidates.

When there is no G-RNTI, a position of a candidate of a GSS needs to be determined. When a size of the candidate of the GSS is the same as a size of a candidate of the CSS, a UE a UE needs to additionally perform only CRS examination on the GSS while performing blind detection on the CSS and, thus, the number of additional blind detections due to additional deployment of the GSS may be reduced.

A position of a GSS candidate to be deployed in each CSS candidate may be defined via system information or higher layer signaling. Candidates of the GSS may be contiguously deployed or may be separately distributed or deployed.

FIG. 11 illustrates GSS candidates having a fixed position in a CSS according to an embodiment of the present invention.

When a GSS candidate and a CSS candidate have the same size, a start index of a CCE, corresponding to an even-numbered or odd-numbered candidate of the CSS, may be used as a start index of a CCE of the GSS candidate.

When the number of CCEs of the GSS candidate is less than that of the CSS candidate, an index of an even-numbered or odd-numbered CCE in an even-numbered or odd-numbered candidate of the CSS may be used as a start index of the CCE of the GSS candidate.

b. GSS in CORESET

When GSSs are contiguously configured without a separate RNTI like a CSS of LTE, a start index of a GSS may be given by applying offset to a start index or end index of a CSS.

The offset may be different for each cell/group. The offset may be notified to the UE via system information, higher layer signaling, or the like.

When a group common PDCCH is transmitted to a portion of a CSS (when a GSS candidate is fixed or not), a UE may assume that the group common PDCCH is transmitted only in a slot in which the CSS is transmitted or a mini-slot.

When the group common PDCCH is transmitted to a CSS and a separate resource, an interval and resource of the slot in which the group common PDCCH is to be transmitted or the mini-slot may be separately configured from the CSS.

When a size of downlink control information (DCI) of the group common PDCCH is different from DCI transmitted in the CSS, a set of slots to be monitored for the group common PDCCH by a UE may be different from a CSS monitoring set. More generally, a slot monitored by the UE or a mini-slot set may be differently configured for each RNTI or a slot monitored by the UE or a mini-slot set may be differently configured for each DCI size.

3. Slot Format Indication for Multiple Component Carriers

When a UE uses a plurality of carriers (e.g., carrier aggregation), a network may notify the UE about a slot format to be used in each carrier.

(1) Transmission of Group Common PDCCH of Multiple CC

A network may transmit a group common PDCCH for each CC to transmit slot format indication for each CC. Alternatively, the network may indicate slot formats of all CCs through one primary CC (PCC).

When the number of CCs used by the UE is high, the network may group CCs to a plurality of groups and define a PCC for each group. The network may indicate a slot format of CCs in a corresponding group through a PCC of each group.

A method of grouping CCs is described below.

(i) CCs with the Same Slot Format

A network may group CCs with the same slot format to the same group. In this case, the network may indicate only a slot format of one CC without indicating a slot format for each CC. Accordingly, an amount of information required for slot format indication and signaling overhead may be reduced.

(ii) CCs with the Same Numerology

A network may group CCs with the same numerology to the same group. In this case, all CCs in a group may have the same slot length. Accordingly, the network may need to consider a difference in slot indexes due to a numerology difference when indicating slot formats with the same time duration.

When a network transmits slot format information on a plurality of CCs, a payload size of a group common PDCCH may be significantly increased. A maximum size of the payload of the group common PDCCH is [slot format information of 1 CC*the number of CCs] and, thus, it may be difficult to increase a size of slot format information of 1 CC. Slot format information in units of symbols requires a large amount of information and, thus, slot format indication to be used when a plurality of CCs is configured for the UE may be slot type indication or slot type indication.

A payload size of a group common PDCCH for multiple CCs may be determined whether CCs are grouped. When the grouped CCs have the same numerology, there is no problem in the case of the same indicated slot type but, when the respective CCs needs to receive indication of different slot types, it may be difficult to support a plurality of CCs by one slot format indication item.

When a slot format is indicated through a slot type pattern, a problem may arise when periods of slot formats to be indicated by CCs in a group are different. As a case in which lengths of slot formats to be received via indication are different for respective CCs, when a UE receives a slot format of a long period, the slot format may be converted into a slot format of a short period. Alternatively, the network may perform indication of a plurality of slot format periods through one slot format indication item.

For example, a pattern of a long slot period may be defined through a pattern in which a short slot period is repeated.

As another example, a pattern of a short slot period associated with a pattern of a long slot period may be predefined. Even if a UE receives a pattern of a long slot pattern, the UE may use a pattern of a short slot period matched with the corresponding pattern.

A more detailed example is described below with reference to FIGS. 12 and 13. FIGS. 12 and 13 illustrate slot patterns of multiple CCs according to an embodiment of the present invention.

In FIGS. 12 and 13, it is assumed that CCs in a group include a CC that receives indication of 4 slots as a slot pattern period and a CC that receives indication of 2 slots as a slot pattern period.

Referring to FIG. 12, a pattern of 4 slot period may be defined in the form in which patterns of 2 slot periods are repeated twice.

Referring to FIG. 13, 2-slot period patterns associated with 4-slot period patterns may be defined.

When numerologies are different for respective CCs but the CCs have the same time duration for slot pattern indication, a slot pattern period may be determined according to a difference in numerology. For example, a pattern of a short slot period may be used for a CC with short SCS and a pattern of a long slot period defined through the pattern of the short slot period may be used for a CC for large SCS. This is because, in the case of the same time duration, the number of slots of a CC with large SCS is greater than the number of slots of a CC with small SCS.

FIG. 14 illustrates slot patterns of multiple CC according to another embodiment of the present invention. It may be assumed that a pattern of 4 slots is a pattern of a CC using SCS of 30 kHz and a pattern of 2 slots is a pattern of CC using SCS of 15 kHz.

In (a) of FIG. 14, a pattern of a 4-slot period may be defined in the form in which patterns of a 2-slot period are repeated twice.

In (b) of FIG. 14, a pattern of a 4-slot period and a pattern of a 2-slot period may be associated with each other.

As such, slot patterns of a plurality of CCs using different numerologies may be indicated through one slot format indication.

When slot formats of a plurality of carriers are indicated through one group common PDCCH, a period of a slot format of each carrier may be matched based on a carrier in which the group common PDCCH is transmitted. When a period of a slot format of each carrier is shorter than a reference period, a new configuration set according to repeated patterns/periods may be given. The case in which a period of a slot format of a specific carrier is longer than a reference period may be handled in a similarly way.

(2) Slot Format Indication Methods

A CC index based on a network and a CC index based on a UE may be different. Accordingly, a network may consider a CC index different when indicating a slot format of a CC.

For example, when a CC based on a network is a NCC and a CC based on a UE is a UCC, NCC 1 may be classified into a plurality of UCCs (e.g., UCC 1 to UCC n). When the network indicates a slot format based on the UCC as a reference of the UE, the UE may appropriately recognize indicated information.

A relationship between the NCC and the UCC may be transmitted UE-specifically. For example, when the number of CCs configured as the NCC is m and the number of CCs configured as the UCC is n, a relationship between the NCC and the UCC may be defined by a network. The relationship between the NCC and the UCC may be signaled via a MAC CE, system information, or a group common PDCCH.

Table 8 below shows an example of a relationship between a NCC and a UCC with respect to one UE.

TABLE 8

| NCC1 | UCC1 |
| | UCC2 |
| | UCC3 |
| NCC2 | UCC4 |
| | UCC5 |
| NCC3 | UCC6 |
| | UCC7 |
| | UCC8 |
| | UCC9 |
| ... | |

(i) Slot Format Indication in Terms of Network

A network may indicate a slot format based on an index of an NCC. Upon receiving indication of a slot format based on an index of the NCC, a UE may find an index of a UCC of the UE, corresponding to the NCC, and may use the indicated slot format as a corresponding slot format of the UCC of the UE.

(ii) Slot Format Indication in Terms of UE

A network may indicate a slot format based on an index of a UCC. The network may define and indicate a slot format by as much as the number UCC_max of UCCs of a UE that has a largest number of UCCs among UEs belonging to the same group. The UE that has UCCs, the number of which is less than UCC_max, may selectively acquire only indication information by as much as the number of the UCCs of the UE and may determine a slot format for each UCC of the UE.

When mapping between the NCC and the UCC is performed in a similar way with respect to a plurality of UEs, it may be easy to indicate a slot format based on a UCC index.

Figure 15:
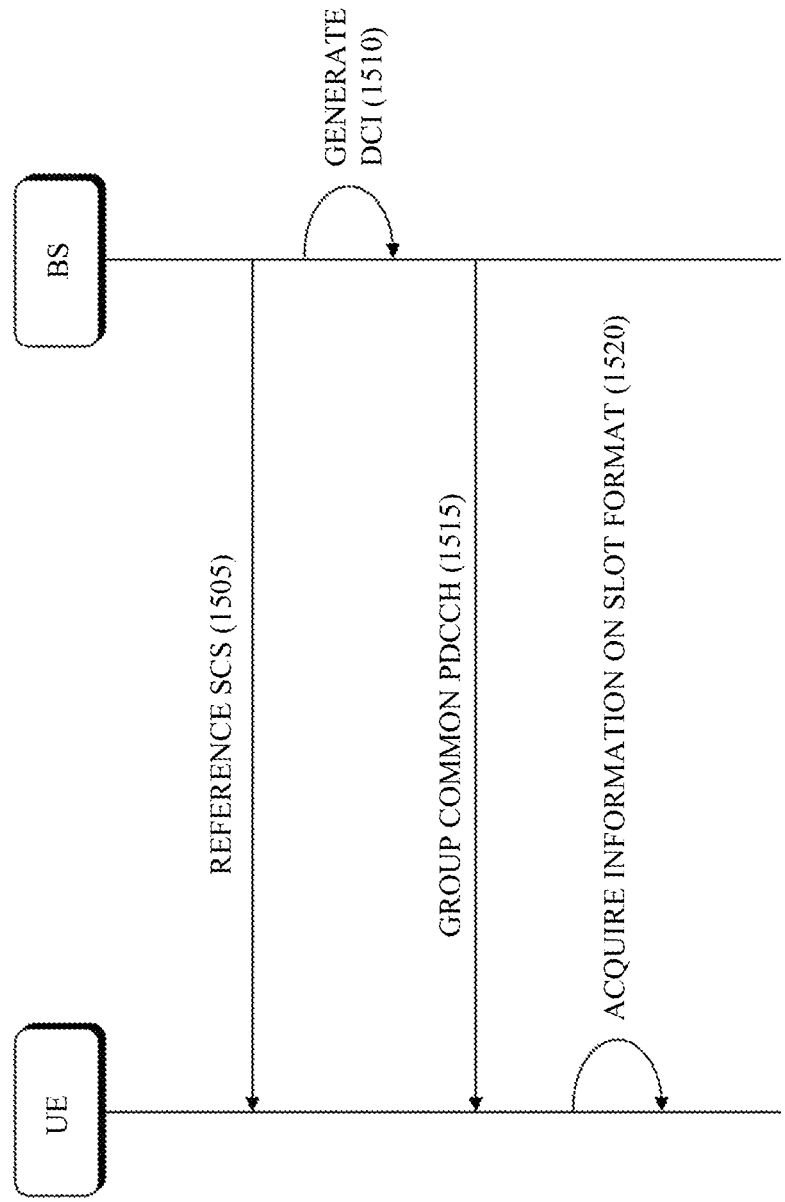
FIG. 15 illustrates a flow of a method of transmitting and receiving downlink control information (DCI) according to an embodiment of the present invention.

FIG. 15 illustrates a flow of a method of transmitting and receiving downlink control information (DCI) according to an embodiment of the present invention. FIG. 15 illustrates an example of the aforementioned methods and, thus, a repeated description of the above description may not be given here.

Referring to FIG. 15, a base station may transmit information on reference SCS among numerologies of a plurality of subcarrier spacing (SCS) (1505). Information on the reference SCS may be transmitted via higher layer signaling.

The base station may generate DL control information including information on a slot format (1510).

The base station may transmit DL control information to a UE group including a UE through a UE group common physical downlink control channel (PDCCH) (1515).

The UE may acquire information on a slot format from the DL control information (1520).

The DL control information may indicate a slot format based on the reference SCS. When the SCS of the UE is different from the reference SCS, the UE may convert a slot format of the reference SCS according to the SCS of the UE.

Time duration of 1 slot may be variable depending on SCS. The reference SCS may be configured to be equal to or less than the SCS of the UE in such a way that time duration of 1 slot based on the reference SCS is equal to or greater than time duration of 1 slot based on the SCS of the UE.

When the SCS of the UE is M times the reference SCS, the UE may interpret 1 slot based on the reference SCS as M contiguous slots based on the SCS of the UE.

The UE may determine, based on the information on the slot format, whether each of a plurality of symbols included in the corresponding slot corresponds to downlink (D), uplink (U) or flexible (X). When the SCS of the UE is M times the reference SCS, the UE may interpret one D, U, or X symbol based on the reference SCS as M number of D, U, or X symbols based on the SCS of the UE.

Information on a slot format may indicate at least one of slot formation combinations configured in the UE.

A plurality of frequency bands may be configured for the UE and each slot format combination may be obtained by combining a plurality of slot formats for a plurality of frequency bands.

Each slot format combination may be obtained by combining a slot format for a DL frequency band and a slot format for an UL frequency band. Alternatively, each slot format combination may be obtained by combining a slot format for a new radio access technology (NR) frequency band and a slot format for a long-term evolution (LTE) frequency band.

Slot format combinations configured for a UE may be received via higher layer signaling and may be a subset of a plurality of slot format combinations supported in a wireless communication system. For example, a slot format of a UL band (e.g., UL BWP) and a slot format of a DL band (e.g., DL BWP) may correspond to one slot format combination. Alternatively, a slot format of a BWP on an NR band and a slot format of a BWP (e.g., SUL) on an LTE band may correspond to one slot format combination. The base station may configure at least one slot format combination(s) among a plurality of slot format combinations via RRC signaling for the UE. Then, the base station may indicate at least one of slot format combination(s) that is RRC-configured for the UE through DCI transmitted through the group common PDCCH.

Figure 16:
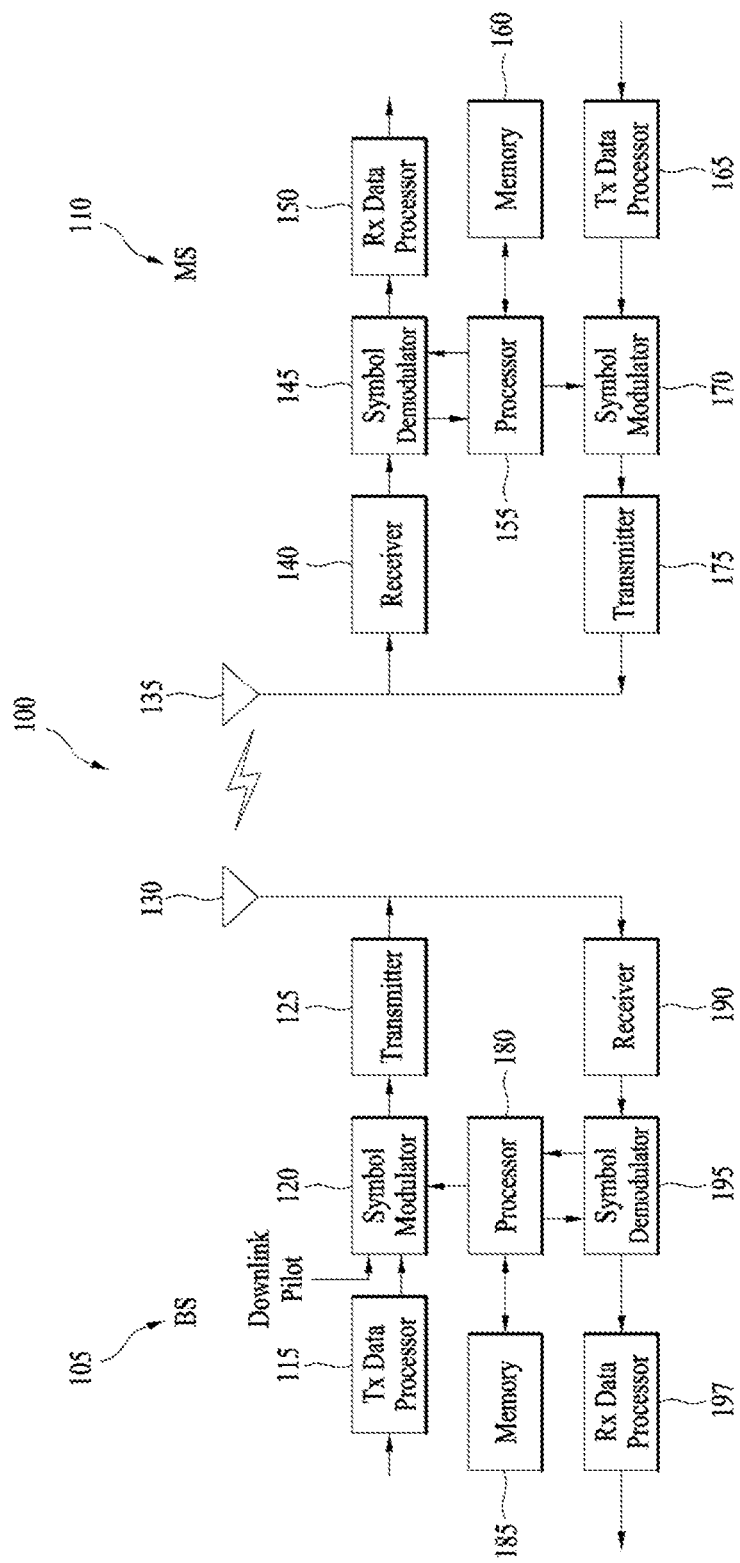
FIG. 16 illustrates a base station (BS) and a user equipment (UE) according to an embodiment of the present invention.

FIG. 16 is a block diagram illustrating a structure of a base station (BS) 105 and a UE 110 in a wireless communication system 100 according to an embodiment of the present invention. The BS 105 may be referred to as an eNB or a gNB. The UE 110 may be referred to a user terminal.

Although one BS 105 and one UE 110 are illustrated for simplifying the wireless communication system 100, the wireless communication system 100 may include one or more BSs and/or one or more UEs.

The BS 105 may include a transmission (Tx) data processor 115, a symbol modulator 120, a transmitter 125, a transmission/reception antenna 130, a processor 180, a memory 185, a receiver 190, a symbol demodulator 195, and a reception (Rx) data processor 197. The UE 110 may include a Tx data processor 165, a symbol modulator 170, a transmitter 175, a transmission/reception antenna 135, a processor 155, a memory 160, a receiver 140, a symbol demodulator 155, and an Rx data processor 150. In FIG. 12, although one antenna 130 is used for the BS 105 and one antenna 135 is used for the UE 110, each of the BS 105 and the UE 110 may also include a plurality of antennas as necessary. Therefore, the BS 105 and the UE 110 according to the present invention support a Multiple Input Multiple Output (MIMO) system. The BS 105 according to the present invention can support both a Single User-MIMO (SU-MIMO) scheme and a Multi User-MIMO (MU-MIMO) scheme.

In downlink, the Tx data processor 115 receives traffic data, formats the received traffic data, codes the formatted traffic data, interleaves the coded traffic data, and modulates the interleaved data (or performs symbol mapping upon the interleaved data), such that it provides modulation symbols (i.e., data symbols). The symbol modulator 120 receives and processes the data symbols and pilot symbols, such that it provides a stream of symbols.

The symbol modulator 120 multiplexes data and pilot symbols, and transmits the multiplexed data and pilot symbols to the transmitter 125. In this case, each transmission (Tx) symbol may be a data symbol, a pilot symbol, or a value of a zero signal (null signal). In each symbol period, pilot symbols may be successively transmitted during each symbol period. The pilot symbols may be an FDM symbol, an OFDM symbol, a Time Division Multiplexing (TDM) symbol, or a Code Division Multiplexing (CDM) symbol.

The transmitter 125 receives a stream of symbols, converts the received symbols into one or more analog signals, and additionally adjusts the one or more analog signals (e.g., amplification, filtering, and frequency upconversion of the analog signals), such that it generates a downlink signal appropriate for data transmission through an RF channel. Subsequently, the downlink signal is transmitted to the UE through the antenna 130.

Configuration of the UE 110 will hereinafter be described in detail. The antenna 135 of the UE 110 receives a DL signal from the BS 105, and transmits the DL signal to the receiver 140. The receiver 140 performs adjustment (e.g., filtering, amplification, and frequency downconversion) of the received DL signal, and digitizes the adjusted signal to obtain samples. The symbol demodulator 145 demodulates the received pilot symbols, and provides the demodulated result to the processor 155 to perform channel estimation.

The symbol demodulator 145 receives a frequency response estimation value for downlink from the processor 155, demodulates the received data symbols, obtains data symbol estimation values (indicating estimation values of the transmitted data symbols), and provides the data symbol estimation values to the Rx data processor 150. The Rx data processor 150 performs demodulation (i.e., symbol-demapping) of data symbol estimation values, deinterleaves the demodulated result, decodes the deinterleaved result, and recovers the transmitted traffic data.

The processing of the symbol demodulator 145 and the Rx data processor 150 is complementary to that of the symbol modulator 120 and the Tx data processor 115 in the BS 205.

The Tx data processor 165 of the UE 110 processes traffic data in uplink, and provides data symbols. The symbol modulator 170 receives and multiplexes data symbols, and modulates the multiplexed data symbols, such that it can provide a stream of symbols to the transmitter 175. The transmitter 175 obtains and processes the stream of symbols to generate an uplink (UL) signal, and the UL signal is transmitted to the BS 105 through the antenna 135. The transmitter and the receiver of UE/BS can be implemented as a single radio frequency (RF) unit.

The BS 105 receives the UL signal from the UE 110 through the antenna 130. The receiver processes the received UL signal to obtain samples. Subsequently, the symbol demodulator 195 processes the symbols, and provides pilot symbols and data symbol estimation values received via uplink. The Rx data processor 197 processes the data symbol estimation value, and recovers traffic data received from the UE 110.

A processor 155 or 180 of the UE 110 or the BS 105 commands or indicates operations of the UE 110 or the BS 105. For example, the processor 155 or 180 of the UE 110 or the BS 105 controls, adjusts, and manages operations of the UE 210 or the BS 105. Each processor 155 or 180 may be connected to a memory unit 160 or 185 for storing program code and data. The memory 160 or 185 is connected to the processor 155 or 180, such that it can store the operating system, applications, and general files.

The processor 155 or 180 may also be referred to as a controller, a microcontroller), a microprocessor, a microcomputer, etc. In the meantime, the processor 155 or 180 may be implemented by various means, for example, hardware, firmware, software, or a combination thereof. In a hardware configuration, methods according to the embodiments of the present invention may be implemented by the processor 155 or 180, for example, one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, methods according to the embodiments of the present invention may be implemented in the form of modules, procedures, functions, etc. which perform the above-described functions or operations. Firmware or software implemented in the present invention may be contained in the processor 155 or 180 or the memory unit 160 or 185, such that it can be driven by the processor 155 or 180.

Radio interface protocol layers among the UE 110, the BS 105, and a wireless communication system (i.e., network) can be classified into a first layer (L1 layer), a second layer (L2 layer) and a third layer (L3 layer) on the basis of the lower three layers of the Open System Interconnection (OSI) reference model widely known in communication systems. A physical layer belonging to the first layer (L1) provides an information transfer service through a physical channel. A Radio Resource Control (RRC) layer belonging to the third layer (L3) controls radio resources between the UE and the network. The UE 110 and the BS 105 may exchange RRC messages with each other through the wireless communication network and the RRC layer.

The above-mentioned embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

As described above, the present invention may be applied to various wireless communication systems.

The invention claimed is:

1. A method performed by a user equipment (UE) configured to operate in a wireless communication system, the method comprising:
   receiving first information regarding a reference subcarrier spacing (SCS); and
   receiving, through a UE group common-physical downlink control channel (PDCCH), downlink control information (DCI) comprising second information regarding a slot format related to the reference SCS,
   wherein, based on the reference SCS being equal to or less than a first SCS used by the UE, the slot format is applied to a certain number of slots of the first SCS, and
   wherein the certain number of the slots are related to a slot of the reference SCS.

2. The method of claim 1, wherein the first information is received through a higher layer signaling.

3. The method of claim 1, wherein a time duration of one slot of the reference SCS is equal or greater than a time duration of each of the certain number of the slots of the first SCS.

4. The method of claim 1, wherein the certain number is determined based on differences between the reference SCS and the first SCS.

5. The method of claim 1, wherein the certain number of the slots of the first SCS comprises the certain number of consecutive slots of the first SCS related to the slot of the reference SCS.

6. The method of claim 5, wherein the slot of the reference SCS comprises a first plurality of symbols,
   wherein each of the certain number of the slots of the first SCS comprises a second plurality of symbols,
   wherein the certain number of consecutive symbols of the first SCS are related to one symbol of the reference SCS, and wherein in a state in which the slot format is applied to the certain number of the slots, for each of the first plurality of symbols in the slot of the reference SCS:
the symbol of the reference SCS is determined to be related to one of downlink, uplink, or flexible based on the second information; and
the certain number of the consecutive symbols of the first SCS are determined to be related to one of downlink, uplink, or flexible.

7. The method of claim 1, wherein the second information comprises information regarding at least one slot format combination configured in the UE.

8. The method of claim 7, wherein the UE is configured with a plurality of frequency bands; and
wherein each of the at least one slot format combination comprises a plurality of slot formats for the plurality of frequency bands.

9. The method of claim 8,
wherein each of the at least one slot format combination comprises (i) a slot format for a downlink frequency band, and (ii) a slot format for an uplink frequency band, or
wherein each of the at least one slot format combination comprises (i) a slot format for a new radio access technology (NR) frequency band, and (ii) a slot format for a long-term evolution (LTE) frequency band.

10. The method of claim 7, wherein the information regarding the at least one slot format combination is received through a higher layer signaling, and
wherein the at least one slot format combination is a subset of a plurality of slot format combinations supported in the wireless communication system.

11. A method performed by a base station (BS) configured to operate in a wireless communication system, the method comprising:
transmitting, to a user equipment (UE), first information regarding a reference subcarrier spacing (SCS); and
transmitting, to a UE group comprising the UE through a UE group common-physical downlink control channel (PDCCH), downlink control information (DCI) comprising second information regarding a slot format related to the reference SCS,
wherein based on the reference SCS being equal to or less than a first SCS used by the UE, the slot format is related to a certain number of slots of the first SCS, and
wherein the certain number of the slots are related to a slot of the reference SCS.

12. A user equipment (UE) configured to operate in a wireless communication system, the UE comprising:
a transceiver; and
at least one processor coupled with the transceiver,
wherein the at least one processor is configured to:
receive first information regarding a reference subcarrier spacing (SCS); and
receive, through a UE group common-physical downlink control channel (PDCCH), downlink control information (DCI) comprising second information regarding a slot format related to the reference SCS,
wherein, based on the reference SCS being equal to or less than a first SCS used by the UE, the slot format is applied to a certain number of slots of the first SCS, and
wherein the certain number of the slots are related to a slot of the reference SCS.

13. A base station (BS) configured to operate in a wireless communication system, the BS comprising:
a transceiver; and
at least one processor coupled with the transceiver,
wherein the at least one processor is configured to:
transmit, to a user equipment (UE), first information regarding a reference subcarrier spacing (SCS); and
transmit, to a UE group comprising the UE through a UE group common-physical downlink control channel (PDCCH), downlink control information (DCI) comprising second information regarding a slot format related to the reference SCS,
wherein based on the reference SCS being equal to or less than a first SCS used by the UE, the slot format is related to a certain number of slots of the first SCS, and
wherein the certain number of the slots are related to a slot of the reference SCS.

* * * * *